US012598044B2

(12) United States Patent
Li et al.

(10) Patent No.: US 12,598,044 B2
(45) Date of Patent: Apr. 7, 2026

(54) PDCCH MONITORING METHOD, PDCCH SENDING METHOD, AND RELATED DEVICE

(71) Applicant: VIVO MOBILE COMMUNICATION CO., LTD., Dongguan (CN)

(72) Inventors: Dongru Li, Dongguan (CN); Na Li, Dongguan (CN); Kai Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 536 days.

(21) Appl. No.: 18/091,506

(22) Filed: Dec. 30, 2022

(65) Prior Publication Data

US 2023/0141826 A1 May 11, 2023

Related U.S. Application Data

(63) Continuation of application No. PCT/CN2021/104254, filed on Jul. 2, 2021.

(30) Foreign Application Priority Data

Jul. 3, 2020 (CN) .......................... 202010635974.2

(51) Int. Cl.
H04L 5/00 (2006.01)
H04L 1/08 (2006.01)
H04L 1/12 (2006.01)

(52) U.S. Cl.
CPC .............. *H04L 5/0053* (2013.01); *H04L 1/08* (2013.01)

(58) Field of Classification Search
CPC ........ H04L 5/0053; H04L 1/08; H04L 5/0091
See application file for complete search history.

(56) References Cited

U.S. PATENT DOCUMENTS 12,089,191 B2 * 9/2024 Lee ................... H04W 72/0446
2020/0015258 A1 * 1/2020 Zhou ..................... H04W 72/20
(Continued)

FOREIGN PATENT DOCUMENTS

CN 105917598 A 8/2016
CN 106559161 A 4/2017
(Continued)

OTHER PUBLICATIONS

3GPP TGS RAN WG1 Meeting#87, R1-1612191 Title: Further discussion on uplink control channel design for NR (Year: 2016).*
(Continued)

*Primary Examiner* — Christopher M Crutchfield
*Assistant Examiner* — Abusayeed M Haque
(74) *Attorney, Agent, or Firm* — IPX PLLC

(57) ABSTRACT

A Physical Downlink Control Channel (PDCCH) monitoring method, a PDCCH sending method, and a terminal are provided. The PDCCH monitoring method includes: obtaining first information; and monitoring a PDCCH repetition based on the first information. The first information includes at least one of the following: a first parameter; a second parameter; a third parameter; and a fourth parameter. The first parameter is used to indicate PDCCH repetition information. The PDCCH repetition information comprises at least one of the following: times of PDCCH repetition, a monitoring occasion of the PDCCH repetition, or duration of each PDCCH repetition. The second parameter is used to indicate whether to perform the PDCCH repetition. The third parameter is used to indicate P search spaces for the PDCCH repetition. P is a positive integer. The fourth parameter is used to indicate Q Control Resource Sets (CORE-SETs) for the PDCCH repetition. Q is a positive integer.

20 Claims, 12 Drawing Sheets

(56) References Cited

U.S. PATENT DOCUMENTS

| | | | |
|---|---|---|---|
| 2020/0169991 | A1 | 5/2020 | Lin et al. |
| 2021/0227569 | A1* | 7/2021 | Xu ........................ H04L 5/0053 |
| 2022/0123885 | A1* | 4/2022 | Shin ................. H04W 72/0446 |
| 2022/0150936 | A1* | 5/2022 | Lee ....................... H04W 52/38 |

FOREIGN PATENT DOCUMENTS

| | | |
|---|---|---|
| CN | 109391971 A | 2/2019 |
| CN | 109787710 A | 5/2019 |
| CN | 109818712 A | 5/2019 |
| CN | 110166197 A | 8/2019 |
| CN | 111132338 A | 5/2020 |
| CN | 111278092 A | 6/2020 |

OTHER PUBLICATIONS

3GPP TGS RAN WG1#98bis, R1-1911477 Title:Summary#2of 7.2.5.3 on UL timing and PRACH for NTN (Year: 2019).*

Extended European Search Report issued in related European Application No. 21832474.7, mailed Nov. 20, 2023, 8 pages.

International Search Report issued in corresponding International Application No. PCT/CN2021/104254, mailed Sep. 28, 2021, 7 pages.

First Office Action issued in related Chinese Application No. 202010635974.2, mailed Jun. 28, 2022, 13 pages.

LG Electronics., Discussion on PDCCH repetition for URLLC, 3GPP TSG RAN WG1 Meeting #92bis, R1-1804571, Apr. 20, 2018, 4 pages.

Sequans Communications, On PDCCH repetition for NR URLLC, 3GPP TSG RAN WG1 Meeting #92bis, R1-1804644, Apr. 20, 2018, 6 pages.

* cited by examiner

501

Send first information to a terminal

502

Send a PDCCH repetition based on the first information

PDCCH MONITORING METHOD, PDCCH SENDING METHOD, AND RELATED DEVICE

CROSS-REFERENCE TO RELATED APPLICATIONS

This application is a continuation of International Application No. PCT/CN2021/104254, filed on Jul. 2, 2021, which claims priority to Chinese Patent Application No. 202010635974.2 filed on Jul. 3, 2020. The entire contents of each of the above-referenced applications are expressly incorporated herein by reference.

TECHNICAL FIELD

This application pertains to the field of communication technologies, and specifically relates to a Physical Downlink Control Channel (PDCCH) monitoring method, a PDCCH sending method, and a related device.

BACKGROUND

Reduced Capability User Equipment (RedCap UE) is a device with limited capabilities, for example, a wearable device, an industrial sensor, or a video monitoring device. Because the RedCap UE has limited capabilities, coverage performance of an existing PDCCH cannot meet a coverage requirement of the RedCap UE.

SUMMARY

Embodiments of this application provide a PDCCH monitoring method, a PDCCH sending method, and a related device.

According to a first aspect, a PDCCH monitoring method is provided, where the method is applied to a terminal, and the method includes:

obtaining first information; and
monitoring a PDCCH repetition based on the first information; where
the first information includes at least one of the following:
a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition;
a second parameter, where the second parameter is used to indicate whether to perform the PDCCH repetition;
a third parameter, where the third parameter is used to indicate P search spaces for the PDCCH repetition, and P is a positive integer; and
a fourth parameter, where the fourth parameter is used to indicate Q control resource sets CORESETs for the PDCCH repetition, and Q is a positive integer.

According to a second aspect, a PDCCH sending method is provided, where the method is applied to a network side device, and the method includes:

sending first information to a terminal; and
sending a PDCCH repetition based on the first information; where
the first information includes at least one of the following:
a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition;
a second parameter, where the second parameter is used to indicate whether to perform the PDCCH repetition;
a third parameter, where the third parameter is used to indicate P search spaces for the PDCCH repetition, and P is a positive integer; and
a fourth parameter, where the fourth parameter is used to indicate Q control resource sets CORESETs for the PDCCH repetition, and Q is a positive integer.

According to a third aspect, a PDCCH monitoring apparatus is provided, where the PDCCH monitoring apparatus is applied to a terminal, and the PDCCH monitoring apparatus includes:

an obtaining module, configured to obtain first information; and
a monitoring module, configured to monitor a PDCCH repetition based on the first information; where
the first information includes at least one of the following:
a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition;
a second parameter, where the second parameter is used to indicate whether to perform the PDCCH repetition;
a third parameter, where the third parameter is used to indicate P search spaces for the PDCCH repetition, and P is a positive integer; and
a fourth parameter, where the fourth parameter is used to indicate Q control resource sets CORESETs for the PDCCH repetition, and Q is a positive integer.

According to a fourth aspect, a PDCCH sending apparatus is provided, where the PDCCH sending apparatus is applied to a network side device, and the PDCCH sending apparatus includes:

a first sending module, configured to send first information to a terminal; and
a second sending module, configured to send a PDCCH repetition based on the first information; where the first information includes at least one of the following:
a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition;
a second parameter, where the second parameter is used to indicate whether to perform the PDCCH repetition;
a third parameter, where the third parameter is used to indicate P search spaces for the PDCCH repetition, and P is a positive integer; and
a fourth parameter, where the fourth parameter is used to indicate Q control resource sets CORESETs for the PDCCH repetition, and Q is a positive integer.

According to a fifth aspect, a terminal is provided. The terminal includes a processor, a memory, and a program or an instruction that is stored in the memory and that can run on the processor, and when the program or the instruction is executed by the processor, steps in the method described in the first aspect are implemented.

According to a sixth aspect, a network side device is provided. The network side device includes a processor, a memory, and a program or an instruction that is stored in the memory and that can run on the processor, and when the program or the instruction is executed by the processor, steps in the method described in the second aspect are implemented.

According to a seventh aspect, a readable storage medium is provided. The readable storage medium stores a program or an instruction, and when the program or the instruction is executed by a processor, steps in the method described in the first aspect are implemented, or steps in the method described in the second aspect are implemented.

According to an eighth aspect, a chip is provided. The chip includes a processor and a communication interface, the communication interface is coupled to the processor, and the processor is configured to run a program or an instruction of a network side device, to implement the method described in the first aspect or the method described in the second aspect.

According to a ninth aspect, an embodiment of this application provides a computer software product, where the computer software product is stored in a non-volatile storage medium, and the software product is configured to be executed by at least one processor to implement steps in the method described in the first aspect or steps in the method described in the second aspect.

According to a tenth aspect, a communication device is provided, where the communication device is configured to perform the method described in the first aspect, or perform the method described in the second aspect.

In the embodiments of this application, first information is obtained, and a PDCCH repetition is monitored based on the first information, where the first information includes at least one of the following: a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition; a second parameter, where the second parameter is used to indicate whether to perform the PDCCH repetition; a third parameter, where the third parameter is used to indicate P search spaces for the PDCCH repetition, and P is a positive integer; and a fourth parameter, where the fourth parameter is used to indicate Q control resource sets CORESETs for the PDCCH repetition, and Q is a positive integer. It can be learned that, in the embodiments of this application, a solution of repeatedly transmitting the PDCCH can be implemented, and coverage of the PDCCH can be enhanced, thereby improving reliability of PDCCH blind detection.

DETAILED DESCRIPTION

The following describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and the character "/" generally represents an "or" relationship between associated objects.

It should be noted that the technology described in the embodiments of this application is not limited to a Long Term Evolution (LTE)/LTE-Advanced (LTE-A) system, and may also be used in various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application are often used interchangeably. The described technology may be used in the foregoing system and radio technology, and may also be used in another system and radio technology. However, a New Radio (NR) system is described below as an example, and the term NR is used in most of the descriptions, although these technologies can also be used in an application other than an application of the NR system, for example, a sixth Generation (6G) communication system.

Figure 1:
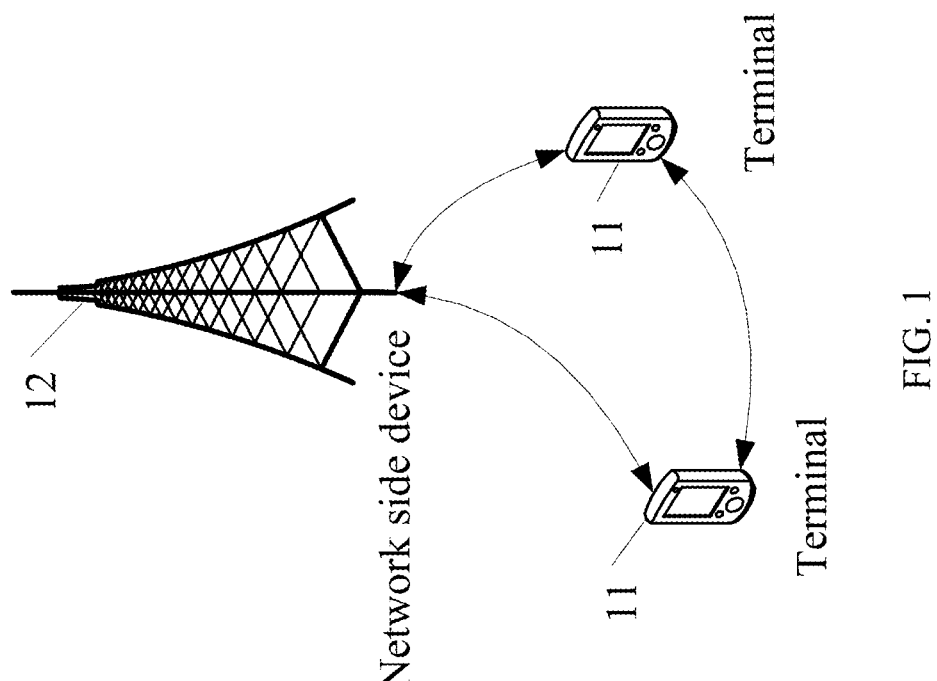
FIG. 1 is a block diagram of a wireless communication system to which an embodiment of this application is applicable.

FIG. 1 is a block diagram of a wireless communication system to which an embodiment of this application is applicable. The wireless communication system includes a terminal 11 and a network side device 12. The terminal 11 may also be referred to as a terminal device or UE. The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device or a Vehicle User Equipment (VUE), or Pedestrian User Equipment (PUE). The wearable device includes a band, a headset, eyeglasses, or the like. It should be noted that a specific type of the terminal 11 is not limited in this embodiment of this application. The network side device 12 may be a base station or a core network. The base station may be referred to as a NodeB, an evolved NodeB (eNB), an access point, a Base Transceiver Station (BTS), a radio base station, a radio transceiver, a Basic Service Set (BSS), an Extended Service Set (ESS), a NodeB, eNB, a home NodeB, a home evolved NodeB, a Wireless Local Area Network (WLAN) access point, a wireless fidelity (WiFi) node, a Transmitting Receiving Point (TRP), or another suitable term in the field, and the base station is not limited to a specific technical term provided that a same technical effect is achieved.

For ease of understanding, some content related to the embodiments of the present disclosure is described below.

1. RedCap UE

The RedCap UE is a device with limited capabilities, for example, a wearable device, an industrial sensor, or a video monitoring device. A reduced capability of the RedCap UE may be embodied in multiple aspects, for example, device complexity, device size reduction, a processing capability, and supported features (a quantity of Carrier Aggregation (CA) Component Carriers (CC) and a quantity of supported receive antennas).

2. PDCCH Resource and Search Space (SS)

A PDCCH in NR carries Downlink Control Information (DCI). After a series of processes such as scrambling, modulation, and encoding, the DCI is mapped to a physical resource in a unit of a Control Channel Element (CCE). For each piece of DCI, L=1, 2, 4, 8, or 16 CCEs may be allocated, and a quantity of CCEs for the DCI is represented as an Aggregation Level (AL). DCI with AL=L is mapped to a Control Resource Set (CORESET) configured on a network side. In addition, multiple SS sets are configured on the network side, and there are two types of SS sets: a Common SS (CS S) set shared by a group of UEs in a cell, and a User-specific SS (US S) set monitored by single UE. The SS set further configures, for the UE, PDCCH candidates that need to be monitored by the UE.

However, it can be learned from Radio Resource Control (RRC) signaling that a configuration of the CORESET does not indicate a specific time domain location at which UE monitors the PDCCH (only a time domain resource is provided, that is, in time domain, Duration of the CORESET: Quantity of symbols). The specific time domain location at which the UE monitors the PDCCH is provided by a Monitoring occasion (MO) provided by an SS. In such a design, greater flexibility can be achieved. The CORESET may be configured at any frequency domain location (a parameter frequency domain resource (frequencyDomain-Resources) Information Element (IE) is configured as a bitmap numbered by a Physical Resource Block (PRB) of a current Bandwidth Part (BWP)). It can be learned that the configuration of the PDCCH can be determined only after one CORESET is bound to one SS. However, it should be noted that one CORESET can be bound to multiple SSs, but one SS can be bound to only one CORESET.

An SS IE configures a monitoring periodicity, a start location, and a slot offset of the UE. A monitoring symbol within slot (monitoringSymbolsWithinSlot) IE parameter may be understood as a start symbol (such as an Orthogonal Frequency Division Multiplex (OFDM) symbol) of an SS on which each slot in consecutive N slots indicated by duration in the SS IE needs an MO.

The SS IE parameter may be shown in Table 1.

TABLE 1

| SS IE parameter | |
| --- | --- |
| Parameter name | Function |
| Search space identifier (searchSpaceId) | Search space ID, used to identify a corresponding search space configuration |
| Control resource set identifier (controlResourceSetId) | Indicate a CORESET bound to the search space |
| Monitoring slot periodicity and offset (monitoringSlotPeriodicityAndOffset) | Indicate a search space periodicity and an offset within the periodicity |
| Duration (duration) | Indicate slot-level duration |
| Start symbol of a PDCCH monitoring occasion within slot (monitoringSymbolsWithinSlot) | Indicate a start symbol of the search space within slot |
| Quantity of PDCCH candidates (nrofCandidates) | Indicate a quantity of PDCCH candidates |
| Search space type (searchSpaceType) | Indicate the search space type and a type of DCI to be blindly detected |

The search space type may include UE-specific search space (for a single user) and common search space (for all users).

For ease of understanding, the SS IE parameter is described below as an example.

TABLE 2

| BWP resource | | |
| --- | --- | --- |
| BWP | CORESET IE | SS IE |
| BWP1 | Frequency domain resource allocation (FrequencyDomainResources) = 000111111111111 . . . (3 0s and 12 1s) Duration = 3 | Monitoring slot periodicity and slot offset (monitoringSlotPeriodicityAndOffset) = sl5.2 Start symbol of a PDCCH monitoring occasion within slot (monitoringSymbolsWithinSlot) = 00100000100000 Duration = 3 |
| BWP2 | Frequency domain resource allocation (FrequencyDomainResources) = 111111111111000 . . . (12 1s) Duration = 2 | Monitoring slot periodicity and slot offset (monitoringSlotPeriodicityAndOffset) = sl4.1 Start symbol of a PDCCH monitoring occasion within slot |

TABLE 2-continued

| BWP resource | | |
|---|---|---|
| BWP | CORESET IE | SS IE |
| | | (monitoringSymbolsWithinSlot) = 00100000000000 Duration = 1 |

Figure 2:
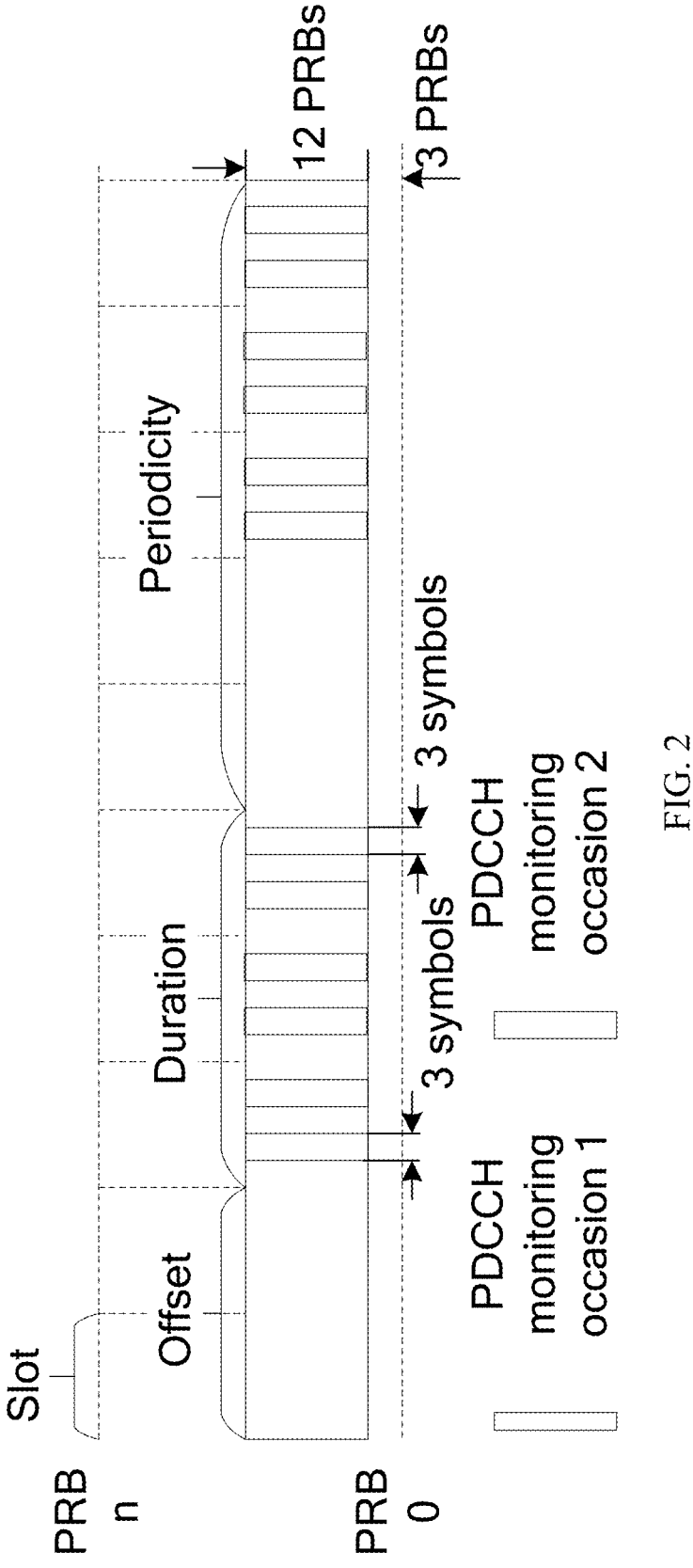
FIG. 2 shows a first BWP according to an embodiment of this application.

For the BWP1 in Table 2, a configuration parameter frequencyDomainResources of the CORESET IE indicates that a CORESET corresponding to the BWP1 is offset by three PRBs, and is consecutive in 12 PRBs. The configuration parameter Duration indicates that one monitoring occasion will last for three OFDM symbols. A configuration parameter monitoringSlotPeriodicityAndOffset of the SS IE indicates that a periodicity of the SS is five slots, and is offset by two slots. The configuration parameter monitoringSymbolsWithinSlot indicates that there are two monitoring occasions in each slot, starting from the third symbol and the ninth symbol. The configuration parameter Duration indicates that the SS is consecutive for three slots, and each slot exists. For a resource of the BWP1, reference may be made to FIG. 2.

For the BWP2 in Table 2, a configuration parameter frequencyDomainResources of the CORESET IE indicates that a CORESET corresponding to the BWP2 is offset by zero PRBs, and is consecutive in 12 PRBs. The configuration parameter Duration indicates that one monitoring occasion will last for two OFDM symbols. A configuration parameter monitoringSlotPeriodicityAndOffset of the SS IE indicates that a periodicity of the SS is four slots, and is offset by one slot. The configuration parameter monitoringSymbolsWithinSlot indicates that there is only monitoring occasion in each slot, starting from the third symbol. The configuration parameter Duration indicates that the SS is consecutive for one slot. For a resource of the BWP2, reference may be made to FIG. 3.

In this embodiment of this application, the PDCCH repetition may also be referred to as a repeated PDCCH or a repeatedly sent PDCCH.

In addition, in this embodiment of this application, unless otherwise specified, search space other than search space at a specific AL may also be represented as a search space set. The search space or the search space set may include multiple ALs.

Figures 3, 4:
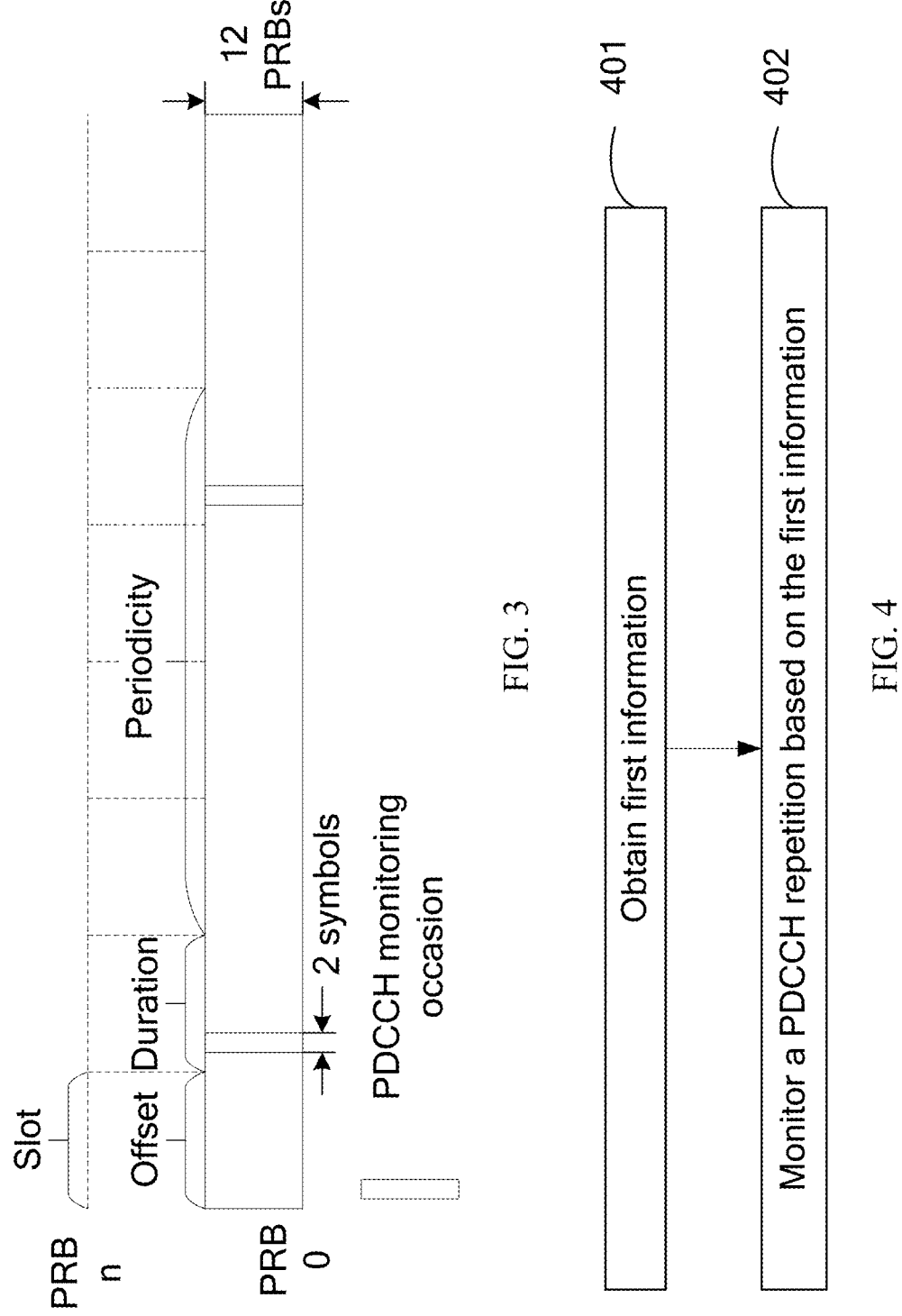
FIG. 3 shows a second BWP according to an embodiment of this application.
FIG. 4 is a flowchart of a PDCCH monitoring method according to an embodiment of this application.

FIG. 4 is a flowchart of a PDCCH monitoring method according to an embodiment of this application. The PDCCH monitoring method in this embodiment of this application may be applied to a terminal.

As shown in FIG. 4, the PDCCH monitoring method may include the following steps:

Step 401: Obtain first information.

In this embodiment of this application, the first information may be but is not limited to at least one of the following:

a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition;

a second parameter, where the second parameter is used to indicate whether to perform the PDCCH repetition;

a third parameter, where the third parameter is used to indicate P search spaces for the PDCCH repetition, and P is a positive integer; and a fourth parameter, where the fourth parameter is used to indicate Q control resource sets CORESETs for the PDCCH repetition, and Q is a positive integer.

The PDCCH repetition information may be used to determine related information of the PDCCH repetition, for example, one or more of a quantity of repetition times, a monitoring occasion, and duration, so that a terminal can conveniently determine a monitoring occasion of the PDCCH repetition.

In an implementation, parameters included in the first information may be carried in different IEs or in a same IE, and this may be determined according to an actual requirement. This is not limited in this embodiment of this application. Further, an IE used to carry the parameters of the first information can be carried by RRC signaling, but is not limited thereto.

In a first implementation, the first information may be carried by a search space information element. In other words, all parameters included in the first information may be carried in the search space IE.

In a second implementation, one or more of the foregoing four parameters may be carried in a search space IE, a CORESET IE, or a newly added IE. It should be understood that multiple parameters included in the first information may be carried in a same IE, or may be carried in different IEs. In other words, the first information may be carried by at least one of a search space IE, a CORESET IE, or a newly added IE. Further, the first information may be carried by at least one of a search space IE or a CORESET IE.

In addition, any one of the foregoing parameters may be any one of the following:

a parameter newly added to an IE that carries the parameter;

an extended parameter of an original parameter in the IE that carries the parameter; and a modified parameter (in other words, the parameter is obtained by modifying the original parameter) of the original parameter in the IE that carries the parameter.

For example, the first parameter may be a parameter newly added to a search space IE that carries the first parameter; the second parameter may be an extended parameter of an original parameter in a search space IE that carries the second parameter, and the original parameter may be a duration parameter or a monitoringSymbolsWithinSlot parameter in the search space IE, but is not limited thereto; the third parameter may be a parameter newly added to a CORESET IE that carries the third parameter; and the fourth parameter may be a modified parameter of an original parameter controlResourceSetId in a search space IE that carries the fourth parameter.

In actual application, the first parameter may be represented as a time monitor location (timeMonitorLocations) parameter, the second parameter may be represented as a repetition on or off (repetitionOnOrOff) parameter, the third parameter may be represented as a linkage search space identifier list (linkagesearchSpaceIdList) parameter, and the fourth parameter may be represented as a control resource set identifier list (controlResourceSetIdList) parameter, but this is not limited thereto.

In an implementation, one or more of the foregoing parameters may be used together. For example, the first information may include the first parameter and the second parameter; or the first information may include the second parameter and the third parameter; or the first information may include the second parameter and the fourth parameter. This is not limited.

For example, the first information includes the first parameter and the second parameter, the first parameter includes PDCCH repetition information, and the information is used to indicate the quantity of repeated transmission times of the PDCCH. The terminal may learn, by obtaining the first information, a search space identifier of search space in which the PDCCH repetition exists and the quantity of repeated transmission times of the PDCCH.

Step 402: Monitor a PDCCH repetition based on the first information.

In an implementation, the monitoring occasion of the repeated PDCCH may be directly obtained based on the foregoing parameters included in the first information. In another implementation, the monitoring occasion of the repeated PDCCH may be obtained based on the foregoing parameters included in the first information and another parameter in an RRC configuration.

For example, if the first information includes the first parameter, and the first parameter is used to indicate PDCCH repetition information, where the PDCCH repetition information includes the monitoring occasion of the PDCCH repetition, the terminal may directly monitor the PDCCH repetition on the monitoring occasion of the PDCCH repetition that is indicated by the first parameter.

If the first information includes the first parameter, and the first parameter is used to indicate PDCCH repetition information, the PDCCH repetition information includes the quantity of repeated transmission times of the PDCCH. The terminal may monitor the repeated PDCCH based on the quantity of repeated transmission times and with reference to the duration parameter or the monitoringSymbolsWithinSlot parameter in the search space IE.

If the first information includes the first parameter and a second parameter, the second parameter is not used to indicate the monitoring occasion of the PDCCH repetition, and PDCCH repetition information included in the first parameter includes an indication of the monitoring occasion of the PDCCH repetition, the terminal combines two parameters to monitor the PDCCH repetition.

According to the PDCCH monitoring method in this embodiment of this application, the terminal may monitor the PDCCH repetition based on the first information. The first information includes at least one of the following: a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition; a second parameter, where the second parameter is used to indicate whether to perform the PDCCH repetition; a third parameter, where the third parameter is used to indicate P search spaces for the PDCCH repetition, and P is a positive integer; and a fourth parameter, where the fourth parameter is used to indicate Q control resource sets CORESETs for the PDCCH repetition, and Q is a positive integer. In the foregoing method, the terminal can enhance PDCCH coverage by monitoring the repeated PDCCH.

In this embodiment of this application, the PDCCH repetition is a PDCCH associated with a target object, and the target object includes any one of the following:

search space for the PDCCH repetition;

a first type of search space for the PDCCH repetition;

a first aggregation level AL for the PDCCH repetition; and downlink control information DCI with a first format for the PDCCH repetition.

Detailed Descriptions are as Follows:

Scenario 1: The target object is search space for the PDCCH repetition.

In an implementation, the search space for the PDCCH repetition may include one or more search spaces. Further, types of different search spaces may be the same or may be different. For example, the search space may be determined according to an actual requirement. This is not limited in this embodiment of this application.

In the scenario 1, the PDCCH repetition may include all PDCCH candidates configured in the search space for the PDCCH repetition.

Scenario 2: The target object is a first type of search space for the PDCCH repetition.

In an implementation, the first type of search space may be UE-specific search space or common search space. In addition, the first type of search space may include one or more search spaces, and may be determined according to an actual requirement. This is not limited in this embodiment of this application.

In the scenario 2, the PDCCH repetition may include all PDCCH candidates configured in the first type of search space for the PDCCH repetition.

Scenario 3: The target object is a first AL for the PDCCH repetition.

The target object is the first AL for the PDCCH repetition, or may be expressed as a PDCCH candidate at the first AL for the PDCCH repetition. In another expression, a PDCCH candidate at a specific AL is referred to as one search space. Therefore, the first AL for the PDCCH repetition may also be referred to as search space at the AL for the PDCCH repetition. In an implementation, the first AL may include one or more ALs, such as AL=4, 8, or 16. This may be determined according to an actual requirement, and is not limited in this embodiment of this application.

In the scenario 3, the PDCCH repetition may include a PDCCH candidate corresponding to the first AL for the PDCCH repetition.

Scenario 4: The target object is DCI with a first format for the PDCCH repetition.

In an implementation, the DCI in the first format may include one or more DCI formats, for example, a DCI format 1-1 and a DCI format 0-1; or a DCI format 1-0 and a DCI format 0-0. This may be determined according to an actual requirement, and is not limited in this embodiment of this application. In addition, this embodiment of this application sets no specific limitation on the DCI in the first format for the PDCCH repetition.

In the scenario 4, the PDCCH repetition may include a PDCCH that carries the DCI in the first format for the PDCCH repetition.

In this embodiment of this application, a representation form of the target object may be determined in at least the following manners:

Manner 1: The representation form of the target object may be directly configured by a network side device or agreed upon in a protocol.

In some embodiments, the target object is determined based on the first information.

The first information further includes a fifth parameter used to indicate the target object, or the second parameter is used to indicate whether the target object performs PDCCH repetition.

In this implementation, the network side device may indicate the target object by using the first information. In an implementation, in an implementation, the network side device may explicitly indicate the target object by configuring the fifth parameter in the first information; and in another implementation, the network side device may indicate the target object by using the second parameter. In this way, the network side device may flexibly configure the target object based on an actual situation, to implement network configuration flexibility.

Manner 2: In some embodiments, the target object may be determined based on a location at which the first information is placed in an IE.

In the manner 2, the IE that carries the first information may include R candidate locations, the R candidate locations may be used to place the first information, different candidate locations in the R candidate locations are associated with different target objects, and R is a positive integer. In this way, the terminal may implicitly obtain or determine the target object based on the location at which the first information is placed in the IE.

For example, the IE that carries the first information is a search space IE, the IE includes a first candidate location and a second candidate location, the target object associated with the first candidate location is the DCI in the first format for the PDCCH repetition, and the target object associated with the second candidate location is the first AL for the PDCCH repetition. If the first information obtained by the terminal is placed at the second candidate location, the terminal may monitor a PDCCH candidate at the first AL for the PDCCH repetition based on the first information.

In some embodiments, the first information includes the first parameter and/or the second parameter; in other words, the first information includes at least one of the first parameter and the second parameter.

In some embodiments, a manner of associating the target object with the second candidate location may be: using the first parameter in the first information as an extended parameter in the AL=4 in the search space IE.

In this way, the network side device does not need to explicitly configure a parameter used to indicate the target object, thereby reducing signaling overheads.

In this embodiment of this application, the monitoring a PDCCH repetition based on the first information includes:

monitoring the PDCCH repetition on N PDCCH monitoring occasions, where the N PDCCH monitoring occasions are determined based on the first information, and N is a positive integer.

In an implementation, the terminal may first determine the N PDCCH monitoring occasions based on the first information, and then monitor the PDCCH repetition on the N PDCCH monitoring occasions.

In some embodiments, the N PDCCH monitoring occasions meet at least one of the following:

in a case that the first information includes the first parameter, and the PDCCH repetition information includes the monitoring occasion of the PDCCH repetition, the N PDCCH monitoring occasions include a monitoring occasion that is of the PDCCH repetition and that is indicated by the PDCCH repetition information;

in a case that the first information includes the first parameter, and the PDCCH repetition information includes the quantity of repeated transmission times of the PDCCH, the N PDCCH monitoring occasions are the first N PDCCH monitoring occasions configured in first search space;

in a case that the first information includes the second parameter and does not include the first parameter, the N PDCCH monitoring occasions are all PDCCH monitoring occasions configured in the first search space;

in a case that the first information includes the third parameter, the N PDCCH monitoring occasions include all PDCCH monitoring occasions configured in the P search spaces; and in a case that the first information includes the fourth parameter, the N PDCCH monitoring occasions include all PDCCH monitoring occasions configured in the search space associated with the Q CORESETs; where the first search space is search space associated with the PDCCH repetition.

Detailed Descriptions are as Follows:

Case 1: The first information includes the first parameter, and the PDCCH repetition information includes the monitoring occasion of the PDCCH repetition.

In the case 1, the N PDCCH monitoring occasions may include the monitoring occasion that is of the PDCCH repetition and that is indicated by the PDCCH repetition information, and may further include a PDCCH monitoring occasion that is originally configured in the first search space. The first search space is search space associated with the IE that carries the first information.

For example, the first information is carried in a search space IE, and a search space identifier (searchSpaceId) carried in the search space IE is an identifier of the first search space. The search space IE configures a PDCCH monitoring occasion of the first search space by using original parameters duration and monitoringSymbolsWithinSlot. In addition, the first information includes the first parameter, and the first parameter is used to indicate the monitoring occasion of the PDCCH repetition. If the terminal is configured with the first search space that carries the first information, the UE needs to monitor two types of PDCCH monitoring occasions indicated by the first parameter and indicated by the original parameter. It can be learned that, in this case, the monitoring occasion that is of the PDCCH repetition and that is indicated by the first parameter is a supplementary indication of the PDCCH monitoring occasion configured in the original search space.

Case 2: The first information includes the first parameter, and the PDCCH repetition information includes the quantity of repeated transmission times of the PDCCH.

In the case 2, the N PDCCH monitoring occasions may include the first N PDCCH monitoring occasions configured in the first search space. The first search space is search space associated with the IE that carries the first information.

For example, the first information is carried in a search space IE, and a search space identifier (searchSpaceId) carried in the search space IE is an identifier of the first search space. The search space IE configures a PDCCH monitoring occasion of the first search space by using original parameters duration and monitoringSymbolsWithinSlot. In addition, the first information includes the first parameter, and the first parameter is used to indicate the quantity of repeated transmission times of the PDCCH. If the terminal is configured with the first search space that carries the first information, the UE may monitor the PDCCH repetition on the first N PDCCH monitoring occasions in the PDCCH monitoring occasions indicated by the original parameter. The terminal may consider that content transmitted on a remaining PDCCH monitoring occasion is not the PDCCH repetition, that is, does not have a repetition characteristic.

Case 3: The first information includes the second parameter and does not include the first parameter.

In the case 3, the N PDCCH monitoring occasions may include all PDCCH monitoring occasions configured in the first search space, and the N PDCCH monitoring occasions are PDCCH monitoring occasions configured in the first search space. The first search space is search space associated with the IE that carries the first information. For example, the first information is carried in a search space IE, and a search space identifier (searchSpaceId) carried in the search space IE is an identifier of the first search space. The search space IE configures a PDCCH monitoring occasion of the first search space by using original parameters duration and monitoringSymbolsWithinSlot. In addition, the first information includes the second parameter, and the second parameter is used to instruct to repeatedly transmit the PDCCH. If the terminal is configured with the first search space that carries the first information, the UE may monitor all PDCCH monitoring occasions in the PDCCH monitoring occasions indicated by the original parameter.

It can be learned that the PDCCH repetition may be repeated in a same SS associated with same CORESETs.

Case 4: The first information includes the third parameter.

In the case 4, CORESETs associated with the P search spaces are the same, or CORESETs associated with the P search spaces are different. It can be learned that the PDCCH repetition is repeated in different search spaces associated with a same CORESET or different CORESETs. An association relationship of the P search spaces is determined based on the third parameter.

Case 5: The first information includes the fourth parameter.

In the case 5, the search space associated with the Q CORESETs may be understood as the same search space associated with the Q CORESETs. It can be learned that the PDCCH repetition may be repeated in a same SS associated with different CORESETs. An association relationship of the Q CORESETs is determined based on the fourth parameter.

It should be noted that, in some implementations, in a case that the first information includes the first parameter, the N PDCCH monitoring occasions may also be determined in another manner.

In some embodiments, the first parameter may indicate the quantity of repeated transmission times of the PDCCH and the monitoring occasion of the PDCCH repetition by using a bitmap or a bit string. In this way, the terminal may simultaneously determine a value of the quantity of repetition transmission times and the N PDCCH monitoring occasions based on the PDCCH repetition information of the first parameter.

In some embodiments, the first parameter may be an extended parameter of monitoringSymbolsWithinSlot in the search space IE.

For example, in a bitmap manner, the first parameter includes 14 bits, and each bit represents one symbol. It is assumed that a value of the first parameter is "11110011001101", and duration of one PDCCH monitoring occasion is one symbol, and this indicates that one slot includes nine PDCCH monitoring occasions, which are respectively the first, the second, the third, the fourth, the seventh, the eighth, the eleventh, the twelfth, and the fourteenth symbols of the slot.

The P search spaces in this embodiment of this application are described below.

In some embodiments, CORESETs associated with the P search spaces are the same, or CORESETs associated with the P search spaces are different.

In an implementation, the P search spaces may be associated with P CORESETs; the P search spaces may be associated with one CORESET; or the P search spaces may be associated with H CORESETs, where H is an integer greater than 1 and less than P.

In some embodiments, M search spaces in the P search spaces have the same time domain-related parameters.

The time-domain related parameters include at least one of the following: a monitoring periodicity, a monitoring offset, duration, or a monitoring symbol within slot (monitoringSymbolsWithinSlot), where M is an integer greater than 1.

In other words, some or all time domain-related parameters of the M search spaces are the same. In this way, a time domain distance between the M search spaces can be ensured to be close, thereby reducing complexity of monitoring, by the terminal, the PDCCH repetition and reducing power consumption.

The Q control resource sets CORESETs in this embodiment of this application are described below.

In some embodiments, frequency domain resources of the Q CORESETs do not overlap.

In some embodiments, in a case that frequency domain resources of at least two CORESETs in the Q CORESETs overlap, the N PDCCH monitoring occasions include all PDCCH monitoring occasions configured in search space associated with a first CORESET; and the first CORESET is K CORESETs whose frequency domain resources do not overlap in the Q CORESETs, and K is an integer greater than 1 and less than or equal to Q.

In this implementation, for the at least two CORESETs whose frequency domain resources overlap, the terminal may consider that a target CORESET in the at least two CORESETs is a valid CORESET, and other CORESETs are invalid CORESETs, where the target CORESET may be any one of the at least two CORESETs. In some embodiments, the target CORESET may be a CORESET with a smallest identifier or a largest identifier in the at least two CORESETs. In this way, it is not difficult to understand that the first CORESET includes the target CORESET.

In this implementation, the terminal may monitor the PDCCH repetition on a PDCCH monitoring occasion in search space associated with K CORESETs whose frequency domain resources do not overlap, and does not monitor the PDCCH repetition on a PDCCH monitoring occasion in search space associated with a second CORESET, where the second CORESET is a CORESET except the first CORESET in the Q CORESETs. In this way, a bind detection success rate of the terminal for monitoring the PDCCH repetition can be improved.

In this embodiment of this application, before the monitoring the PDCCH repetition based on the first information, the method further includes:

reporting terminal capability information to the network side device, where the terminal capability information includes at least one of the following: a blind detection manner supported by the terminal, and a PDCCH repetition manner supported by the terminal.

In this way, it may be convenient for the network side device to configure a blind detection manner or a PDCCH repetition manner that matches a capability of the terminal, thereby improving a bind detection success rate of the terminal for monitoring the PDCCH repetition.

In some embodiments, the blind detection manner includes at least one of the following: joint blind detection or independent blind detection.

The PDCCH repetition manner includes at least one of the following: segmented DCI transmission or integral DCI transmission.

The joint blind detection may be understood as follows: The terminal buffers PDCCHs monitored in the N PDCCH monitoring occasions for joint blind detection and demodulation.

The independent blind detection may be understood as follows: The terminal needs to separately perform independent blind detection and demodulation on a PDCCH monitored in each of the N PDCCH monitoring occasions.

The integral DCI transmission may be understood as follows: DCI is transmitted as a whole. In this way, one complete piece of DCI may be monitored on each PDCCH monitoring occasion of the N PDCCH monitoring occasions of the terminal.

The segmented DCI transmission may be understood as follows: DCI is split into multiple pieces for transmission, where a splitting manner may be even splitting or the like. In this way, the terminal may detect a part of one complete piece of DCI on each PDCCH monitoring occasion in the N PDCCH monitoring occasions, and all content monitored by the terminal in the N PDCCH monitoring occasions forms one complete piece of DCI.

In some embodiments, after the reporting terminal capability information to a network side device, and before the monitoring the PDCCH repetition based on the first information, the method further includes:

receiving configuration information sent by the network side device, where the configuration information is used to configure at least one of the following: a target blind detection manner, and a target PDCCH repetition manner; and the monitoring a PDCCH repetition based on the first information includes:

monitoring the PDCCH repetition based on the configuration information and the first information.

The target blind detection manner may be joint blind detection or independent blind detection. The PDCCH repetition manner may be segmented DCI transmission or integral DCI transmission.

In this implementation, the network side device may configure, based on a related capability reported by the terminal, at least one of the target blind detection manner and the target PDCCH repetition manner that match the capability of the terminal.

In some embodiments, in a case that a blind detection capability supported by the terminal does not include joint blind detection, the target PDCCH repetition manner is integral DCI transmission. In this way, the terminal may monitor a complete piece of DCI on each PDCCH monitoring occasion, so that a blind detection success rate of the DCI can be improved, and detected content does not need to be combined or jointly demodulated, thereby reducing power consumption of the terminal.

In an implementation, after successfully performing monitoring on a PDCCH monitoring occasion in the N PDCCH monitoring occasions, the terminal may no longer perform blind detection, to reduce power consumption of the terminal. If the detection fails, the terminal continues the detection until the detection succeeds.

In a case that the terminal supports joint blind detection, in a first implementation, the target PDCCH repetition manner configured by the network side device may be segmented DCI transmission, and after buffering all monitored content, the terminal may obtain one piece of complete DCI through joint demodulation. For example, a PDCCH candidate of AL=4 configured by a network is repeatedly transmitted three times, and the DCI format 1-1 is split into three equal parts and mapped to corresponding PDCCH candidates. The UE needs to buffer all content repeatedly transmitted for three times and blindly detect a PDCCH candidate of AL=4+4+4=12. In this manner, a quantity of blind detection times can be reduced.

In a second implementation, the target PDCCH repetition manner configured by the network side device may be integral DCI transmission, and the terminal may buffer all content obtained through monitoring, and perform demodulation and combination processing.

In some embodiments, in a case that the target blind detection manner is joint blind detection and the target PDCCH repetition manner is integral DCI transmission, DCI carried by the PDCCH repetition meets at least one of the following: a same DCI size, a same DCI format, or same DCI content.

For example, when the network configures repeated transmission of the DCI format 0-0 and the DCI format 1-0, in a case that the target blind detection manner is joint blind detection, and the target PDCCH repetition manner is integral DCI transmission, the terminal does not expect to detect the DCI format 0-0 and the DCI format 1-0 that are inconsistent in content and/or inconsistent in size on the monitoring occasion of the PDCCH repetition.

Figures 5, 6:
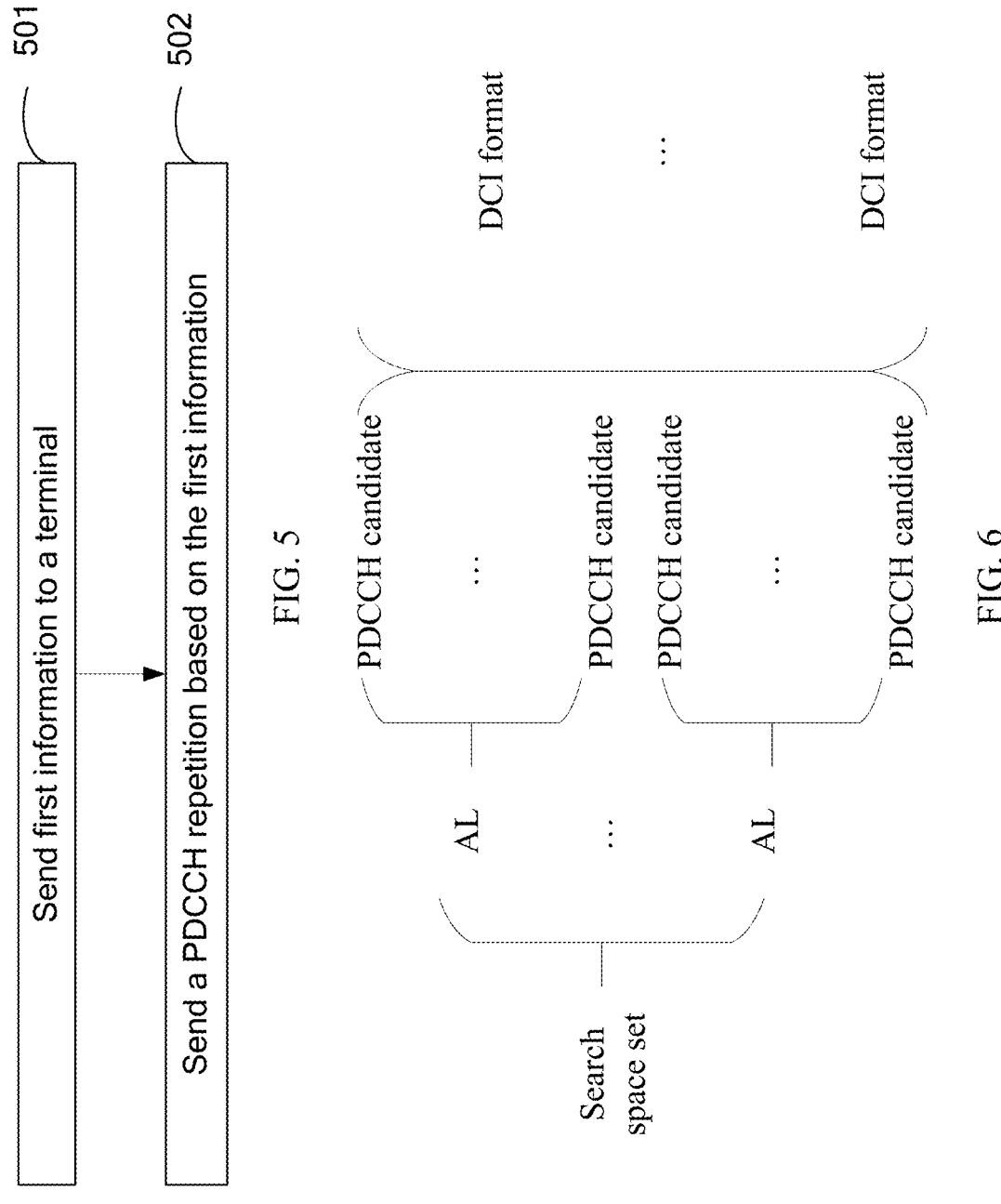
FIG. 5 is a flowchart of a PDCCH sending method according to an embodiment of this application.
FIG. 6 is a schematic diagram of a resource relationship according to an embodiment of this application.

FIG. 5 is a flowchart of a PDCCH sending method according to an embodiment of this application. The PDCCH sending method in this embodiment of this application is applied to a network side device.

As shown in FIG. 5, the PDCCH sending method may include the following steps:

Step 501: Send first information to a terminal.

Step 502: Send a PDCCH repetition based on the first information.

The first information includes at least one of the following:

a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition;

a second parameter, where the second parameter is used to indicate whether to perform the PDCCH repetition;

a third parameter, where the third parameter is used to indicate P search spaces for the PDCCH repetition, and P is a positive integer; and a fourth parameter, where the fourth parameter is used to indicate Q control resource sets CORESETs for the PDCCH repetition, and Q is a positive integer.

In the PDCCH sending method in this embodiment of this application, the first information is sent to the terminal, and the PDCCH repetition is sent based on the first information; where the first information includes at least one of the following: a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition; a second parameter, where the second parameter is used to indicate whether to perform the PDCCH repetition; a third parameter, where the third parameter is used to indicate P search spaces for the PDCCH repetition, and P is a positive integer; and a fourth parameter, where the fourth parameter is used to indicate Q control resource sets CORESETs for the PDCCH repetition, and Q is a positive integer. It can be learned that, in the PDCCH sending method in this embodiment of this application, a solution of repeatedly transmitting the PDCCH can be implemented, and coverage of the PDCCH can be enhanced, thereby improving reliability of PDCCH blind detection.

In some embodiments, the PDCCH repetition is a PDCCH associated with a target object, and the target object includes any one of the following:

search space for the PDCCH repetition;

a first type of search space for the PDCCH repetition;

a first aggregation level AL for the PDCCH repetition; and downlink control information DCI with a first format for the PDCCH repetition.

In some embodiments, the target object is determined based on the first information.

The first information further includes a fifth parameter used to indicate the target object, or the second parameter is used to indicate whether the target object performs PDCCH repetition.

In some embodiments, the sending a PDCCH repetition based on the first information includes:

sending the PDCCH repetition on N PDCCH monitoring occasions, where the N PDCCH monitoring occasions are determined based on the first information, and N is a positive integer.

In some embodiments, the N PDCCH monitoring occasions meet at least one of the following:

in a case that the first information includes the first parameter, and the PDCCH repetition information includes the monitoring occasion of the PDCCH repetition, the N PDCCH monitoring occasions include a monitoring occasion that is of the PDCCH repetition and that is indicated by the PDCCH repetition information;

in a case that the first information includes the first parameter, and the PDCCH repetition information includes the quantity of repeated transmission times of the PDCCH, the N PDCCH monitoring occasions are the first N PDCCH monitoring occasions configured in first search space;

in a case that the first information includes the second parameter and does not include the first parameter, the N PDCCH monitoring occasions are all PDCCH monitoring occasions configured in the first search space;

in a case that the first information includes the third parameter, the N PDCCH monitoring occasions include all PDCCH monitoring occasions configured in the P search spaces; and in a case that the first information includes the fourth parameter, the N PDCCH monitoring occasions include all PDCCH monitoring occasions configured in the search space associated with the Q CORESETs; where the first search space is search space associated with the PDCCH repetition.

In some embodiments, CORESETs associated with the P search spaces are the same, or CORESETs associated with the P search spaces are different.

In some embodiments, M search spaces in the P search spaces have the same time domain-related parameters.

The time-domain related parameters include at least one of the following: a monitoring periodicity, a monitoring offset, duration, or a monitoring symbol within slot, where M is an integer greater than 1.

In some embodiments, frequency domain resources of the Q CORESETs do not overlap.

In some embodiments, in a case that frequency domain resources of at least two CORESETs in the Q CORESETs overlap, the N PDCCH monitoring occasions include all PDCCH monitoring occasions configured in search space associated with a first CORESET; and the first CORESET is K CORESETs whose frequency domain resources do not overlap in the Q CORESETs, and K is an integer greater than 1 and less than or equal to Q.

In some embodiments, before the sending a PDCCH repetition based on the first information, the method further includes:

receiving terminal capability information reported by the terminal, where the terminal capability information includes at least one of the following: a blind detection manner supported by the terminal, and a PDCCH repetition manner supported by the terminal.

In some embodiments, the blind detection manner includes at least one of the following: joint blind detection or independent blind detection.

The PDCCH repetition manner includes at least one of the following: segmented DCI transmission or integral DCI transmission.

In some embodiments, after the receiving terminal capability information reported by the terminal, and before the sending a PDCCH repetition based on the first information, the method further includes:

sending configuration information to the terminal, where the configuration information is used to configure at least one of the following: a target blind detection manner, and a target PDCCH repetition manner; and the sending a PDCCH repetition based on the first information includes:

sending the PDCCH repetition based on the configuration information and the first information.

In some embodiments, in a case that a blind detection capability supported by the terminal does not include joint blind detection, the target PDCCH repetition manner is integral DCI transmission.

In some embodiments, in a case that the target blind detection manner is joint blind detection and the target PDCCH repetition manner is integral DCI transmission, DCI carried by the PDCCH repetition meets at least one of the following: a same DCI size, a same DCI format, or same DCI content.

In some embodiments, the first information is carried in at least one of a search space information element or a CORESET information element.

It should be noted that this embodiment is used as an implementation of the network side corresponding to the method embodiment in FIG. 4. Therefore, reference may be made to related descriptions in the method embodiment in FIG. 4, and a same effect can be achieved. To avoid repetition of description, details are not described herein again.

It should be noted that the multiple implementations described in the embodiments of this application may be implemented in combination with each other, or may be separately implemented. This is not limited in the embodiments of this application.

For ease of understanding, example descriptions are as follows:

(1) Three solutions for implementing PDCCH repetition are provided in this embodiment of this application.

Solution 1: Being repeated in one (same) SS of a same CORESET.

Solution 2: Being repeated in different SSs of a same or different CORESET(s).

Solution 3: Being repeated in a same SS of different CORESETs.

In an implementation, a new parameter may be introduced/defined or an existing parameter may be extended/enhanced to indicate repetition of a PDCCH in time domain and/or frequency domain. A repetition granularity (which may be understood as a repetition object) may be repetition of an entire SS, repetition of an SS type, such as a CSS or a USS, repetition of all PDCCH candidates at an AL, and repetition of a group of DCI formats or a DCI format.

For a relationship between the search space set, the AL, the PDCCH candidate, and the DCI format, reference may be made to FIG. 6.

As shown in FIG. 6, resources in all ALs form one search space set. One AL may include one or more PDCCH candidates. The PDCCH candidate may carry one or more DCI formats.

The parameter may indicate any one or more of repeated time domain granularities (a slot level, a symbol level, a slot bundle, a symbol bundle, or a span), locations, or quantities of repetition times.

(2) A blind detection manner in this embodiment of this application is joint blind detection or independent blind detection.

(3) A repetition manner of this embodiment of this application is: splitting one piece of DCI into each repeated SS resource for transmission, or repeatedly transmitting one complete piece of DCI on multiple SS resources.

(4) According to a user (that is, UE) capability, the network side device configures a blind detection manner and a repetition manner that match the user capability.

Detailed Descriptions are as Follows:

Solution 1: PDCCH repetition is implemented in one (same) SS of a same CORESET.

Option 1: In a search space IE, a parameter timeMonitorLocations is added, and the parameter is used to indicate repetition in time domain.

In an implementation, the parameter may be placed at different locations, to implement repetition of a DCI format, repetition of a PDCCH candidate at a group of ALs, and the like.

There are several potential placement locations below. For example, repetition of an entire SS may be implemented at a location ① of the search space IE, repetition of a CSS or a USS may be implemented at a location ② of the search space IE, repetition of a group of DCI formats may be implemented at a location ④ of the search space IE, and repetition of all PDCCH candidates at an AL may be implemented at a location ⑤ of the search space IE.

A value of the parameter may be X bits, and a quantity of repetition times and a repetition location may be indicated in a manner of a bitmap or a code-point. For example, in the bitmap manner, timeMonitorLocations=14 bits, where each bit represents one symbol. If the value of the parameter is '11110011001101', it indicates that the parameter is repeated nine times within one slot.

The granularity may also be slot-level or multiple slot bundles. For example, for bundles of two symbols, timeMonitorLocations=7 bits, and each bit represents two symbols. If the value of the parameter is '1110000', it indicates that six symbols are repeated within one slot.

For another example, in a code-point manner, a repetition factor or a number enumerated {n1, n2, n4, n8, n16, . . . , nx} is introduced, where n1 represents no repetition (transmission is performed once), n2 represents that repeated transmission is performed twice, and nx represents that repeated transmission is performed x times.

Figure 7:
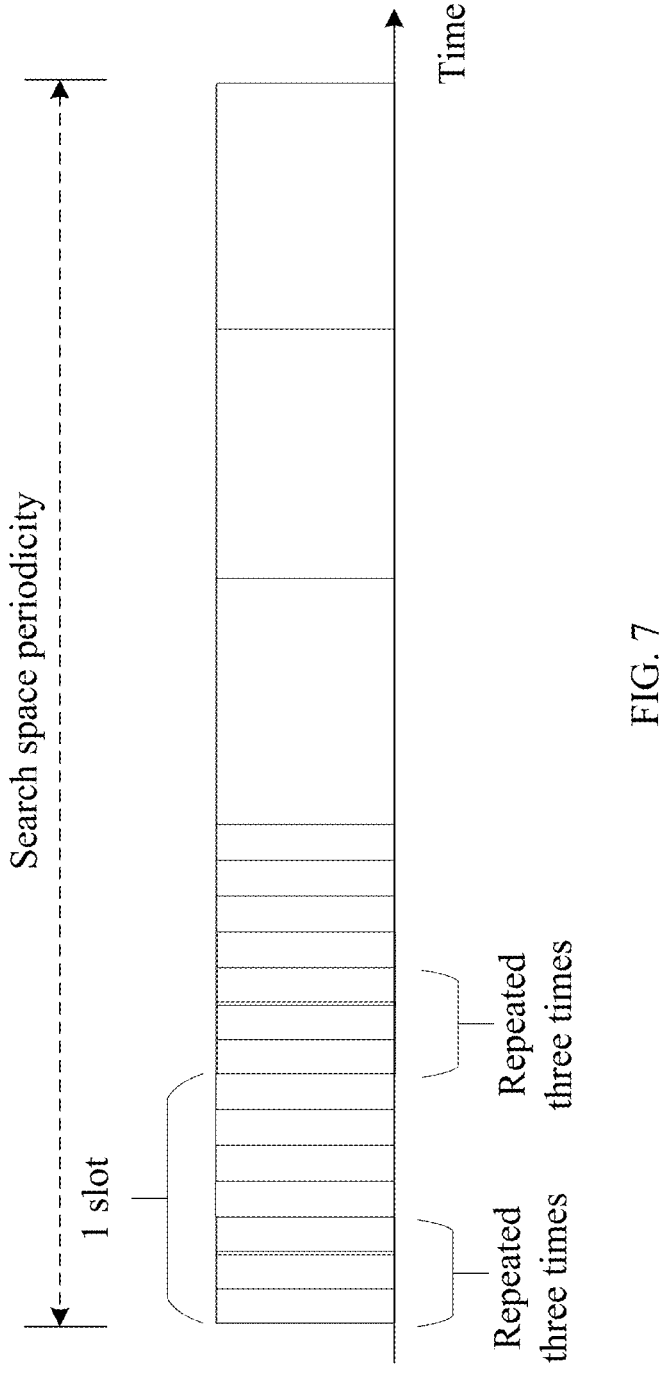
FIG. 7 is a first schematic diagram of a repeated PDCCH monitoring occasion according to an embodiment of this application.

For ease of understanding, it is assumed that a periodicity of the SS is 5 slots, duration is 2 slots, monitoringSymbolsWithinSlot='10000000000000', and duration of the CORESET is 2 symbols. In addition, it is assumed that timeMonitorLocations at the location ⑤ of search space IE is configured as '1110000'. Therefore, for a PDCCH monitoring occasion of the SS, reference may be made to FIG. 7. Each slot in the duration of the SS is repeated three times.

Option 2: An existing parameter is expanded to implement repetition of an entire SS level, for example, the duration or monitoringSymbolsWithinSlot parameter in the foregoing SS IE is expanded.

For example, a parameter repetitionOnOrOff is extended in the duration of the search space IE. A value of the parameter may be 1 bit, where '0' indicates no repetition, and '1' indicates repetition; or may be multiple bits, where each code point represents different quantities of repetition times. In another example, repetition or not is distinguished through configuration or no configuration. If the parameter is configured, it indicates repetition. If the parameter is not configured, it indicates no repetition.

Figure 8:
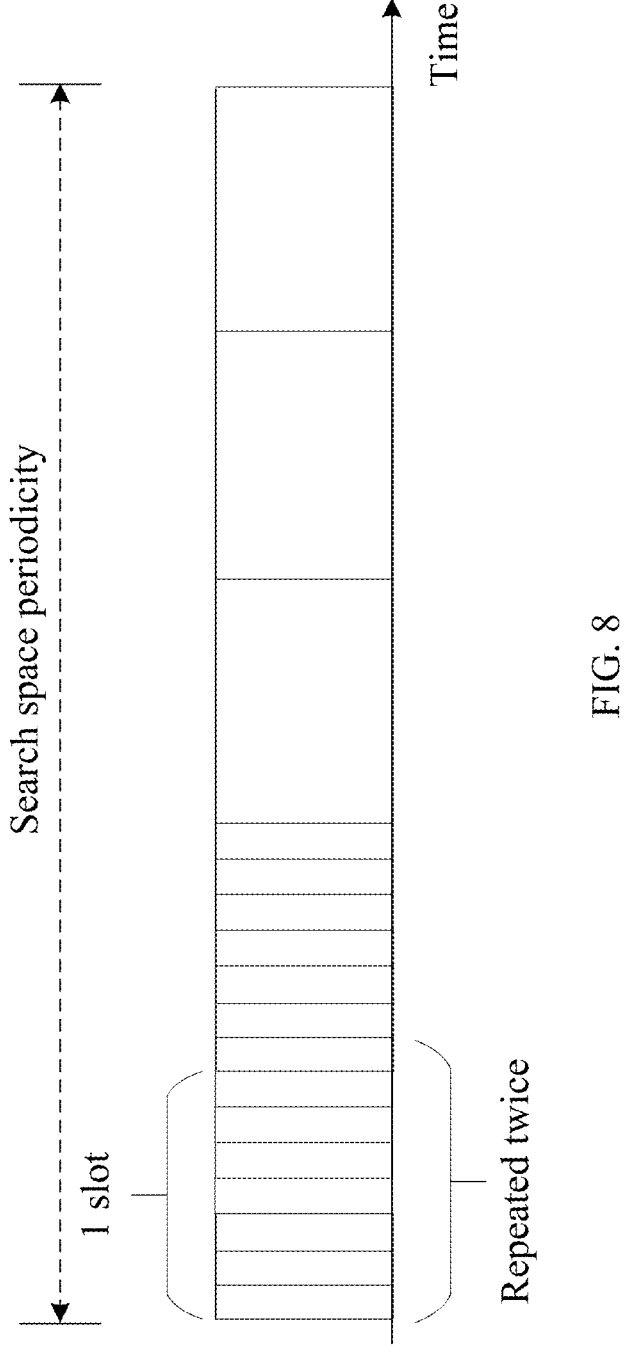
FIG. 8 is a second schematic diagram of a repeated PDCCH monitoring occasion according to an embodiment of this application.

For ease of understanding, it is assumed that a periodicity of the SS is 5 slots, duration is 2 slots, monitoringSymbolsWithinSlot='10000000000000', and the duration of CORESET is 2 symbols. In addition, it is assumed that repetitionOnOrOff=1 is configured in the duration of the search space IE, and therefore, repetition is performed twice in different slots of the duration of the SS. For a PDCCH monitoring occasion of the SS, reference may be made to FIG. 8.

Option 3: A duration or monitoringSymbolsWithinSlot parameter in an original SS IE is reused, and repetitionOnOrOff is configured at several locations provided in the foregoing option 1 to implement repetition of different granularities.

For example, a parameter repetitionOnOrOff is configured at AL 4 by using a related configuration of an existing SS IE. If the parameter is set to '1', it indicates that AL4 is repeated in all PDCCH MOs configured in the SS.

For ease of understanding, it is assumed that a periodicity of the SS is 5 slots, duration is 2 slots, monitoringSymbolsWithinSlot='10000000000000', and the duration of CORESET is 2 symbols. In addition, it is assumed that repetitionOnOrOff=1 is configured in AL=4, and therefore, repetition is performed twice in different slots of the duration of the SS. For a PDCCH monitoring occasion of the SS, reference may be made to FIG. 8.

Solution 2: PDCCH repetition within different SSs.

The linking between different SSs needs to be configured, for example, linkagesearchSpaceIdList is configured in a CORESET IE or a new IE. This parameter indicates multiple SSs with PDCCH repetition linkage.

The linkagesearchSpaceIdList may indicate an SS of a Most Significant Bit (MSB) or a Least Significant Bit (LSB) in the linkagesearchSpaceIdList, and the repetitionOnOrOff parameter is configured in a certain parameter, which indicates that the parameter is repeated between different SSs, so as to implement PDCCH repetition of different granularities, for example, a PDCCH candidate at an AL. In another example, configuring the foregoing PDCCH repetition parameter in CORESET IE or new IE is not excluded. If nothing is configured, the default granularity of the PDCCH repetition is SS.

The foregoing different SSs may be associated with the same CORESET, or may be associated with different CORESETs.

If the foregoing different SSs may be associated with different CORESETs, different CORESETs need to not overlap.

All or some of time-domain related parameters (e.g., monitoringSlotPeriodicityAndOffset, duration, or monitoringSymbolsWithinSlot etc.) of different linking SSs are the same. For example, periodicities i.e., monitoringSlotPeriodicity of different linking SSs need to be the same. In addition, offsets i.e., monitoringSlotOffset and duration of different SSs can be the same. Or they have similar configuration parameters. This is to ensure that different SSs are near in terms of time domain.

Figure 9:
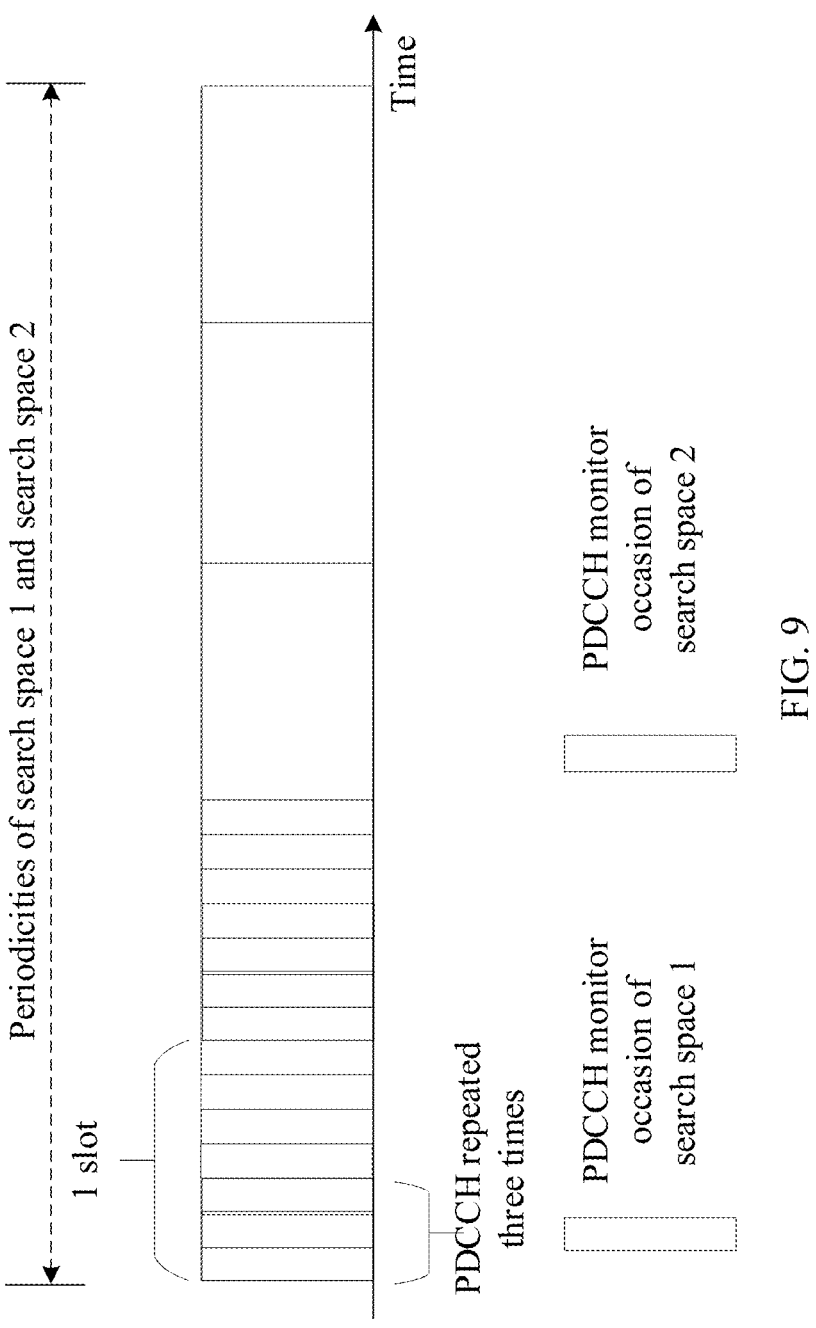
FIG. 9 is a third schematic diagram of a repeated PDCCH monitoring occasion according to an embodiment of this application.

For ease of understanding, it is assumed that for SS1: periodicity is 5 slots, duration is 2 slots, and monitoringSymbolsWithinSlot=10000000000000'; and for SS2, periodicity is 5 slots, duration is 2 slots, and monitoringSymbolsWithinSlot='00101000000000'. In addition, it is assumed that a parameter linkagesearchSpaceIdList (SS1, SS2) is added to the CORESET IE, and duration is 2 symbols. In this case, repetition is performed once within one slot of the duration of the SS1, and repetition is performed twice within one slot of the duration of the SS2. For a PDCCH monitoring occasion, reference may be made to FIG. 9.

Solution 3: Being repeated in a same SS of different CORESETs.

Existing controlResourceSetId in the SS IE can be changed to controlResourceSetIdList. The parameter includes multiple CORESETs with PDCCH repetition linkage.

In the SS, a repetition granularity may be configured with reference to the solution 1, that is, repetition of an entire SS or repetition of a PDCCH candidate at an AL.

The multiple CORESETs with PDCCH repetition linkage relationship cannot overlap in frequency domain or a limitation condition is not defined. However, when multiple CORESETs overlap, the user considers that a CORESET with a smallest CORESET id is a valid CORESET, and the user gives up PDCCH detection of other CORESETs.

Figure 10:
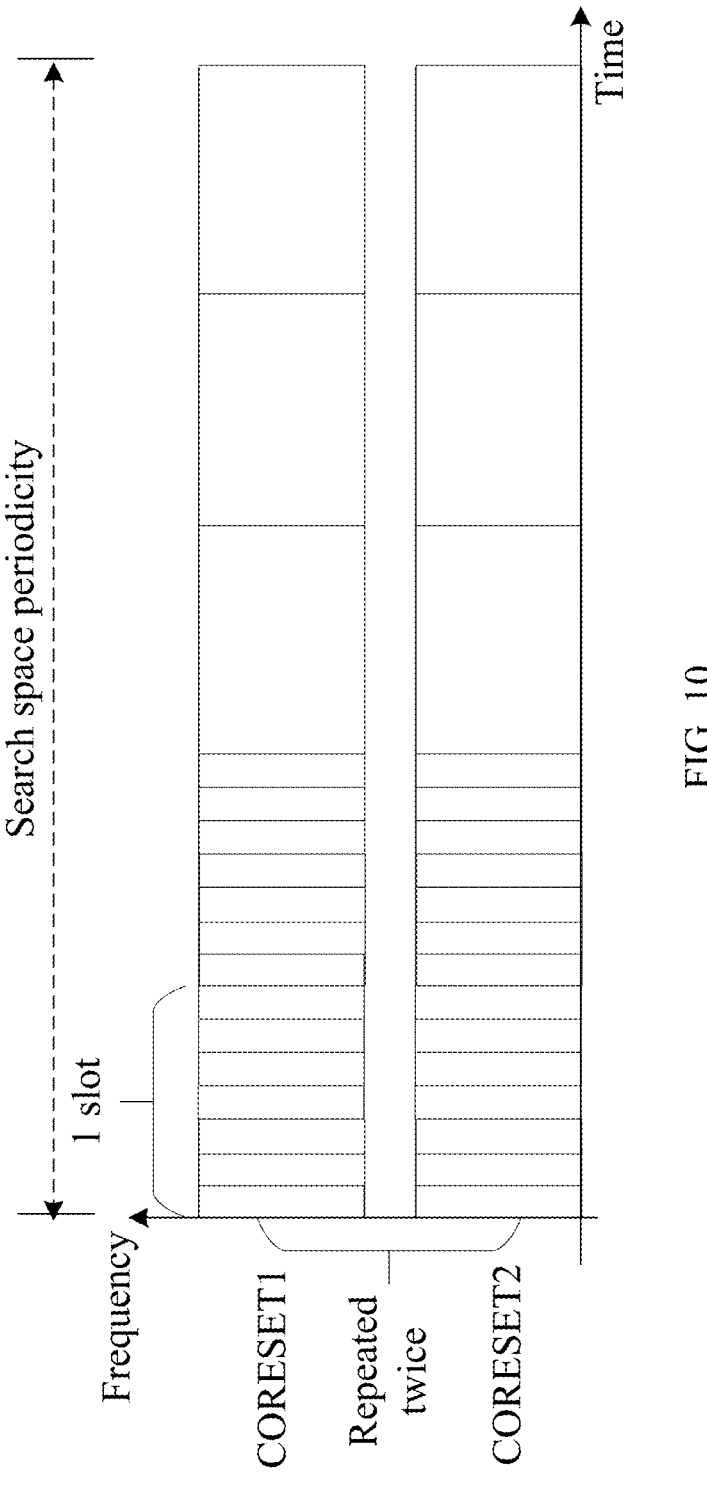
FIG. 10 is a fourth schematic diagram of a repeated PDCCH monitoring occasion according to an embodiment of this application.

For ease of understanding, it is assumed that a periodicity of an SS1 is 5 slots, duration is 2 slots, and monitoringSymbolsWithinSlot='10000000000000'. It is also assumed that the SS1 is associated with two different CORESETs (CORESET1, CORESET2). In this case, for a PDCCH monitoring occasion, reference may be made to FIG. 10.

In this example, for the foregoing three solutions:
(1) In the blind detection manner of the UE, the following capabilities are defined:
Joint blind detection: Joint demodulation is performed on all repeated SS resources buffered by the UE.
Independent blind detection: The UE needs to detect and demodulate each repeated SS resource separately.
(2) In the repetition manner, the following two capabilities are defined:
One piece of DCI is split onto each repeated SS resource for transmission.
One complete piece of DCI is repeatedly transmitted on multiple SS resources. Each repeated SS resource carries a complete piece of DCI.
(3) The UE reports a capability based on the blind detection manner and the repetition manner. If the network is configured with PDCCH repetition and the UE is configured to perform joint detection or combine multiple detection results, the UE does not expect to detect different DCI on multiple repeated SS resources. The different means at least one of the following: a DCI size, a DCI format, or DCI content.
(4) According to a capability reported by the user, the base station configures a blind detection manner and a corresponding repetition manner that match the user capability.
If the user supports only independent blind detection:
The base station may configure a repetition manner 2: One complete piece of DCI is repeatedly transmitted on multiple SS resources. The UE does not continue blind detection after successful detection. The detection fails, and the UE continues detection until the detection succeeds. The UE does not need to perform soft bit combination on results of previous multiple detections, so that power consumption of the terminal can be reduced.
If the user supports joint blind detection, a repetition manner of DCI in this case is configured by the network or is agreed on in a protocol.
If the base station configures the repetition manner 1, after buffering all repeated SS resources, the UE needs to perform joint demodulation to obtain a complete piece of DCI. For example, a PDCCH candidate of AL=4 configured by a network is repeatedly transmitted three times, and the DCI format 1-1 is split into three equal parts and mapped to corresponding PDCCH candidates. The UE needs to buffer all corresponding SS resources repeatedly transmitted for three times and blindly detect a PDCCH candidate of AL=4+4+4=12. In this manner, a quantity of blind detection times can be reduced.
If the base station configures the repetition manner 2, behavior of the UE is to buffer all repeated SS resources for joint demodulation.

This embodiment of this application includes at least the following content: Three solutions for implementing PDCCH repetition: repetition in one SS (Solution 1), repetition in different SSs (Solution 2), and repetition in a same SS of different CORESETs (Solution 3). Blind detection mode: joint or independent blind detection. Repetition manner: DCI is split (equally divided) to each repeated part for transmission or entire DCI is repeatedly transmitted. According to the user capability, the base station configures a blind detection manner and a repetition manner that match the user capability.

In this embodiment of this application, a feasible implementation solution of PDCCH repetition is designed and provided, thereby enhancing PDCCH coverage and reducing impact on a standard.

It should be noted that, the PDCCH monitoring method provided in this embodiment of this application may be performed by a PDCCH monitoring apparatus or a control module in the PDCCH monitoring apparatus that is configured to perform the PDCCH monitoring method. In this embodiment of this application, the PDCCH monitoring apparatus provided in this embodiment of this application is described by using an example in which the PDCCH monitoring apparatus performs the PDCCH monitoring method.

Figures 11, 12:
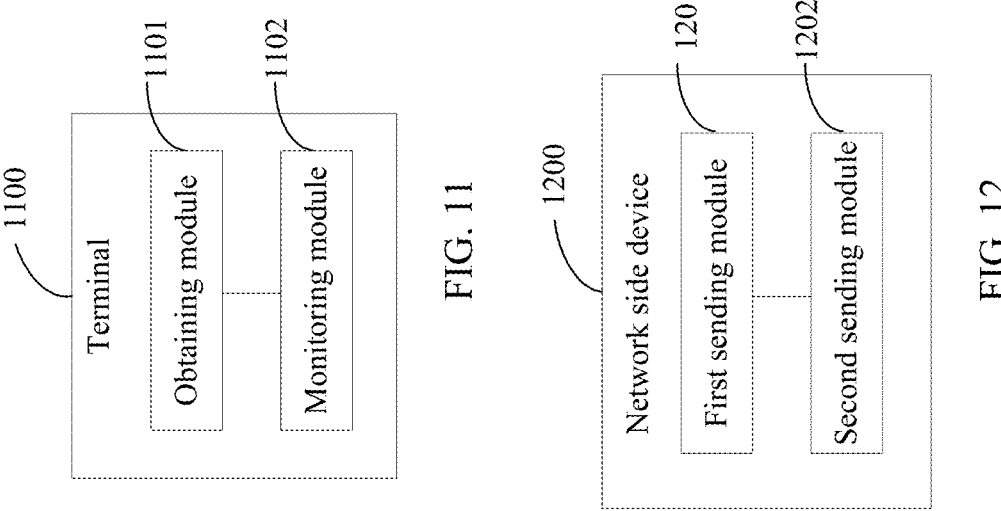
FIG. 11 is a structural diagram of a PDCCH monitoring apparatus according to an embodiment of this application.
FIG. 12 is a structural diagram of a PDCCH sending apparatus according to an embodiment of this application.

FIG. 11 is a structural diagram of a PDCCH monitoring apparatus according to an embodiment of this application.

As shown in FIG. 11, the PDCCH monitoring apparatus 1100 includes:
an obtaining module 1101, configured to obtain first information; and
a monitoring module 1102, configured to monitor a PDCCH repetition based on the first information.

The first information includes at least one of the following:

a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition;

a second parameter, where the second parameter is used to indicate whether to perform the PDCCH repetition;

a third parameter, where the third parameter is used to indicate P search spaces for the PDCCH repetition, and P is a positive integer; and a fourth parameter, where the fourth parameter is used to indicate Q control resource sets CORESETs for the PDCCH repetition, and Q is a positive integer.

In some embodiments, the PDCCH repetition is a PDCCH associated with a target object, and the target object includes any one of the following:

search space for the PDCCH repetition;

a first type of search space for the PDCCH repetition;

a first aggregation level AL for the PDCCH repetition; and downlink control information DCI with a first format for the PDCCH repetition.

In some embodiments, the target object is determined based on the first information.

The first information further includes a fifth parameter used to indicate the target object, or the second parameter is used to indicate whether the target object performs PDCCH repetition.

In some embodiments, the monitoring module 1102 is configured to:

monitor the PDCCH repetition on N PDCCH monitoring occasions, where the N PDCCH monitoring occasions are determined based on the first information, and N is a positive integer.

In some embodiments, the N PDCCH monitoring occasions meet at least one of the following:

in a case that the first information includes the first parameter, and the PDCCH repetition information includes the monitoring occasion of the PDCCH repetition, the N PDCCH monitoring occasions include a monitoring occasion that is of the PDCCH repetition and that is indicated by the PDCCH repetition information;

in a case that the first information includes the first parameter, and the PDCCH repetition information includes the quantity of repeated transmission times of the PDCCH, the N PDCCH monitoring occasions are the first N PDCCH monitoring occasions configured in first search space;

in a case that the first information includes the second parameter and does not include the first parameter, the N PDCCH monitoring occasions are all PDCCH monitoring occasions configured in the first search space;

in a case that the first information includes the third parameter, the N PDCCH monitoring occasions include all PDCCH monitoring occasions configured in the P search spaces; and in a case that the first information includes the fourth parameter, the N PDCCH monitoring occasions include all PDCCH monitoring occasions configured in the search space associated with the Q CORESETs;

The first search space is search space associated with the PDCCH repetition.

In some embodiments, CORESETs associated with the P search spaces are the same, or CORESETs associated with the P search spaces are different.

In some embodiments, M search spaces in the P search spaces have the same time domain-related parameters.

The time-domain related parameters include at least one of the following: a monitoring periodicity, a monitoring offset, duration, or a monitoring symbol within slot, where M is an integer greater than 1.

In some embodiments, frequency domain resources of the Q CORESETs do not overlap.

In some embodiments, in a case that frequency domain resources of at least two CORESETs in the Q CORESETs overlap, the N PDCCH monitoring occasions include all PDCCH monitoring occasions configured in search space associated with a first CORESET; and the first CORESET is K CORESETs whose frequency domain resources do not overlap in the Q CORESETs, and K is an integer greater than 1 and less than or equal to Q.

In some embodiments, the PDCCH monitoring apparatus 1100 further includes:

a reporting module, configured to report terminal capability information to a network side device, where the terminal capability information includes at least one of the following: a blind detection manner supported by the terminal, and a PDCCH repetition manner supported by the terminal.

In some embodiments, the blind detection manner includes at least one of the following: joint blind detection or independent blind detection.

The PDCCH repetition manner includes at least one of the following: segmented DCI transmission or integral DCI transmission.

In some embodiments, the PDCCH monitoring apparatus 1100 further includes:

a first receiving module, configured to receive configuration information sent by the network side device, where the configuration information is used to configure at least one of the following: a target blind detection manner, and a target PDCCH repetition manner; and the monitoring module is configured to:

monitor the PDCCH repetition based on the configuration information and the first information.

In some embodiments, in a case that a blind detection capability supported by the terminal does not include joint blind detection, the target PDCCH repetition manner is integral DCI transmission.

In some embodiments, in a case that the target blind detection manner is joint blind detection and the target PDCCH repetition manner is integral DCI transmission, DCI carried by the PDCCH repetition meets at least one of the following: a same DCI size, a same DCI format, or same DCI content.

In some embodiments, the first information is carried in at least one of a search space information element or a CORESET information element.

The PDCCH monitoring apparatus in this embodiment of this application may be an apparatus, or may be a component, an integrated circuit, or a chip in a terminal. The apparatus may be a mobile terminal, or may be a non-mobile terminal. For example, the mobile terminal may include but is not limited to the foregoing listed types of terminals 11. The non-mobile terminal may be a server, a Network Attached Storage (NAS), a Personal Computer (PC), a Television (TV), a teller machine, or a self-service machine. This is not specifically limited in this embodiment of this application.

The PDCCH monitoring apparatus in this embodiment of this application may be an apparatus with an operating system. The operating system may be an Android operating system, may be an iOS operating system, or may be another possible operating system. This is not specifically limited in this embodiment of this application.

The PDCCH monitoring apparatus 1100 provided in this embodiment of this application can implement each process implemented in the method embodiment of FIG. 4, and a same technical effect is achieved. To avoid repetition, details are not described herein again.

It should be noted that, the PDCCH sending method provided in this embodiment of this application may be performed by a PDCCH sending apparatus or a control module that is in the PDCCH sending apparatus and that is configured to perform the PDCCH sending method. In this embodiment of this application, the PDCCH sending apparatus provided in this embodiment of this application is described by using an example in which the PDCCH sending apparatus performs the PDCCH sending method.

FIG. 12 is a structural diagram of a PDCCH sending apparatus according to an embodiment of this application.

As shown in FIG. 12, the PDCCH sending apparatus 1200 includes:

a first sending module 1201, configured to send first information to a terminal; and a second sending module 1202, configured to send a PDCCH repetition based on the first information.

The first information includes at least one of the following:

a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition;

a second parameter, where the second parameter is used to indicate whether to perform the PDCCH repetition;

a third parameter, where the third parameter is used to indicate P search spaces for the PDCCH repetition, and P is a positive integer; and a fourth parameter, where the fourth parameter is used to indicate Q control resource sets CORESETs for the PDCCH repetition, and Q is a positive integer.

In some embodiments, the PDCCH repetition is a PDCCH associated with a target object, and the target object includes any one of the following:

search space for the PDCCH repetition;

a first type of search space for the PDCCH repetition;

a first aggregation level AL for the PDCCH repetition; and downlink control information DCI with a first format for the PDCCH repetition.

In some embodiments, the target object is determined based on the first information.

The first information further includes a fifth parameter used to indicate the target object, or the second parameter is used to indicate whether the target object performs PDCCH repetition.

In some embodiments, the second sending module 1202 is configured to:

send the PDCCH repetition on N PDCCH monitoring occasions, where the N PDCCH monitoring occasions are determined based on the first information, and N is a positive integer.

In some embodiments, the N PDCCH monitoring occasions meet at least one of the following:

in a case that the first information includes the first parameter, and the PDCCH repetition information includes the monitoring occasion of the PDCCH repetition, the N PDCCH monitoring occasions include a monitoring occasion that is of the PDCCH repetition and that is indicated by the PDCCH repetition information;

in a case that the first information includes the first parameter, and the PDCCH repetition information includes the quantity of repeated transmission times of the PDCCH, the N PDCCH monitoring occasions are the first N PDCCH monitoring occasions configured in first search space;

in a case that the first information includes the second parameter and does not include the first parameter, the N PDCCH monitoring occasions are all PDCCH monitoring occasions configured in the first search space;

in a case that the first information includes the third parameter, the N PDCCH monitoring occasions include all PDCCH monitoring occasions configured in the P search spaces; and in a case that the first information includes the fourth parameter, the N PDCCH monitoring occasions include all PDCCH monitoring occasions configured in the search space associated with the Q CORESETs; where the first search space is search space associated with the PDCCH repetition.

In some embodiments, CORESETs associated with the P search spaces are the same, or CORESETs associated with the P search spaces are different.

In some embodiments, M search spaces in the P search spaces have the same time domain-related parameters.

The time-domain related parameters include at least one of the following: a monitoring periodicity, a monitoring offset, duration, or a monitoring symbol within slot, where M is an integer greater than 1.

In some embodiments, frequency domain resources of the Q CORESETs do not overlap.

In some embodiments, in a case that frequency domain resources of at least two CORESETs in the Q CORESETs overlap, the N PDCCH monitoring occasions include all PDCCH monitoring occasions configured in search space associated with a first CORESET; and the first CORESET is K CORESETs whose frequency domain resources do not overlap in the Q CORESETs, and K is an integer greater than 1 and less than or equal to Q.

In some embodiments, the PDCCH sending apparatus 1200 further includes:

a second receiving module, configured to receive terminal capability information reported by the terminal, where the terminal capability information includes at least one of the following: a blind detection manner supported by the terminal, and a PDCCH repetition manner supported by the terminal.

In some embodiments, the blind detection manner includes at least one of the following: joint blind detection or independent blind detection.

The PDCCH repetition manner includes at least one of the following: segmented DCI transmission or integral DCI transmission.

In some embodiments, the PDCCH sending apparatus 1200 further includes:

a third sending module, configured to send configuration information to the terminal, where the configuration information is used to configure at least one of the following: a target blind detection manner, and a target PDCCH repetition manner; and the second sending module is configured to:

send the PDCCH repetition based on the configuration information and the first information.

In some embodiments, in a case that a blind detection capability supported by the terminal does not include joint blind detection, the target PDCCH repetition manner is integral DCI transmission.

In some embodiments, in a case that the target blind detection manner is joint blind detection and the target PDCCH repetition manner is integral DCI transmission, DCI carried by the PDCCH repetition meets at least one of the following: a same DCI size, a same DCI format, or same DCI content.

In some embodiments, the first information is carried in at least one of a search space information element or a CORE-SET information element.

The PDCCH sending apparatus in this embodiment of this application may be an apparatus, or may be a component, an integrated circuit, or a chip in a network side device. The network side device may include but is not limited to the types of network side devices 12 listed above. This is not specifically limited in this embodiment of this application.

The PDCCH sending apparatus 1200 provided in this embodiment of this application can implement each process implemented in the method embodiment of FIG. 5, and a same technical effect is achieved. To avoid repetition, details are not described herein again.

Figure 13:
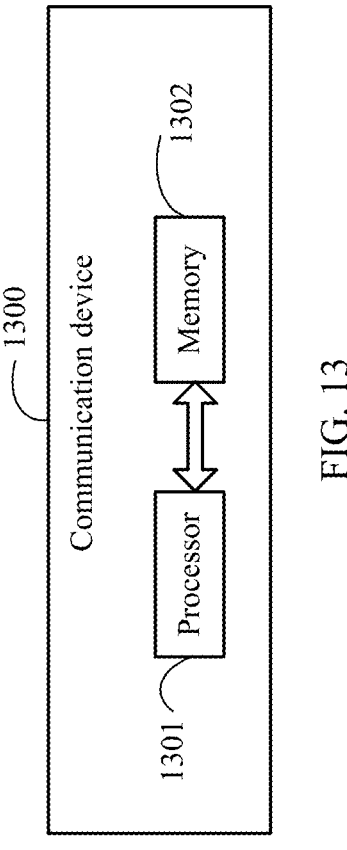
FIG. 13 is a structural diagram of a communication device according to an embodiment of this application.

For example, as shown in FIG. 13, an embodiment of this application further provides a communication device 1300, including a processor 1301, a memory 1302, a program or an instruction that is stored in the memory 1302 and that can run on the processor 1301. For example, when the communication device 1300 is a terminal, the program or the instruction is executed by the processor 1301 to implement each process in the method embodiment of FIG. 4, and a same technical effect can be achieved. When the communication device 1300 is a network side device, when the program or the instruction is executed by the processor 1301, each process in the method embodiment of FIG. 5 is implemented, and a same technical effect can be achieved. To avoid repetition, details are not described herein again.

Figure 14:
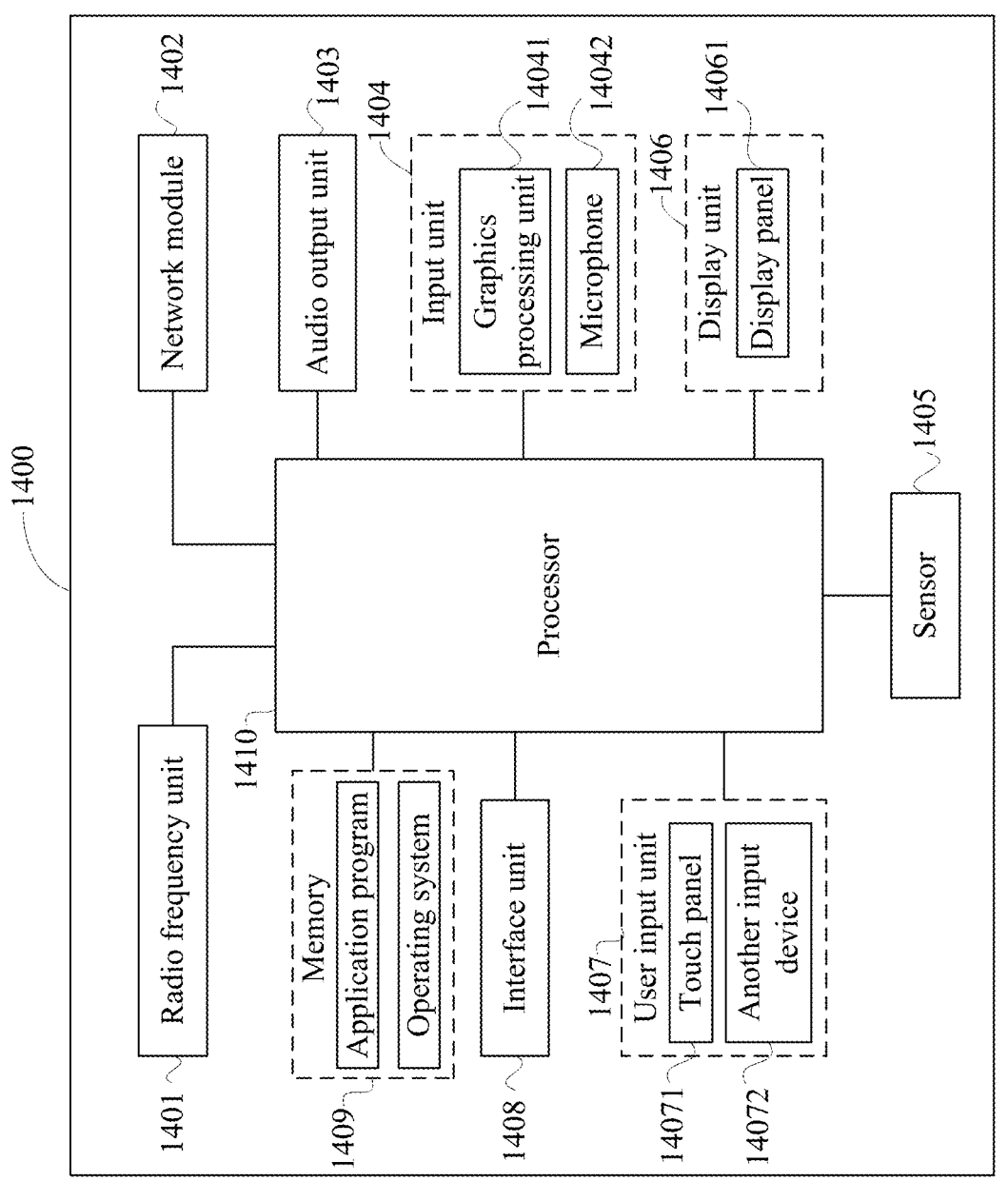
FIG. 14 is a structural diagram of a terminal according to an embodiment of this application.

FIG. 14 is a schematic diagram of a hardware structure of a terminal according to an embodiment of this application.

The terminal 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

It may be understood by a person skilled in the art that the terminal 1400 may further include a power supply (such as a battery) that supplies power to each component. The power supply may be logically connected to the processor 1410 by using a power management system, to implement functions such as charging, discharging, and power consumption management by using the power management system. A structure of the terminal shown in FIG. 14 does not constitute a limitation on the terminal device, and may include more or fewer parts than those shown in the figure, or combine some parts, or have different part arrangements. Details are not described herein again.

It should be understood that, in this embodiment of this application, the input unit 1404 may include a Graphics Processing Unit (GPU) 14041 and a microphone 14042. The graphics processing unit 14041 processes image data of a static picture or a video obtained by an image capture apparatus (such as a camera) in a video capture mode or an image capture mode. The display unit 1406 may include a display panel 14061, and the display panel 14061 may be configured in a form of a liquid crystal display, an organic light emitting diode, or the like. The user input unit 1407 includes a touch panel 14071 and another input device 14072. The touch panel 14071 is also referred to as a touchscreen. The touch panel 14071 may include two parts: a touch detection apparatus and a touch controller. The another input device 14072 may include but is not limited to one or more of a physical keyboard, a function key (such as a volume control key or an on/off key), a trackball, a mouse, a joystick, and the like. Details are not described herein.

In this embodiment of this application, after receiving downlink data from a network side device, the radio frequency unit 1401 sends the downlink data to the processor 1410 for processing, and sends uplink data to the network side device. Generally, the radio frequency unit 1401 includes but is not limited to an antenna, at least one amplifier, a transceiver, a coupler, a low noise amplifier, a duplexer, and the like.

The memory 1409 may be configured to store a software program or an instruction and various data. The memory 1409 may mainly include a storage program or instruction area and a storage data area, where the storage program or instruction area may store an operating system, an application program or an instruction required by at least one function (such as a sound play function or an image play function), and the like. In addition, the memory 1409 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one magnetic disk storage device, a flash memory device, or another non-volatile solid-state storage device.

The processor 1410 may include one or more processing units. In some embodiments, the processor 1410 may be integrated with an application processor and a modem processor. The application processor mainly processes an operating system, a user interface, an application program or an instruction, and the like, and the modem processor mainly processes wireless communication, for example, a baseband processor. It may be understood that the modem processor may also not be integrated into the processor 1410.

The radio frequency unit 1401 is configured to:

obtain first information; and monitor a PDCCH repetition based on the first information.

The first information includes at least one of the following:

a first parameter, where the first parameter is used to indicate PDCCH repetition information, and the PDCCH repetition information includes at least one of the following: times of PDCCH repetition, a monitoring occasion of the PDCCH repetition, or duration of each PDCCH repetition;

a second parameter, where the second parameter is used to indicate whether to perform the PDCCH repetition;

a third parameter, where the third parameter is used to indicate P search spaces for the PDCCH repetition, and P is a positive integer; and a fourth parameter, where the fourth parameter is used to indicate Q control resource sets CORESETs for the PDCCH repetition, and Q is a positive integer.

In some embodiments, the PDCCH repetition is a PDCCH associated with a target object, and the target object includes any one of the following:

search space for the PDCCH repetition;

a first type of search space for the PDCCH repetition;

a first aggregation level AL for the PDCCH repetition; and downlink control information DCI with a first format for the PDCCH repetition.

In some embodiments, the target object is determined based on the first information.

The first information further includes a fifth parameter used to indicate the target object, or the second parameter is used to indicate whether the target object performs PDCCH repetition.

In some embodiments, the radio frequency unit 1401 is configured to:

monitor the PDCCH repetition on N PDCCH monitoring occasions, where the N PDCCH monitoring occasions are determined based on the first information, and N is a positive integer.

In some embodiments, the N PDCCH monitoring occasions meet at least one of the following:

in a case that the first information includes the first parameter, and the PDCCH repetition information includes the monitoring occasion of the PDCCH repetition, the N PDCCH monitoring occasions include a monitoring occasion that is of the PDCCH repetition and that is indicated by the PDCCH repetition information;

in a case that the first information includes the first parameter, and the PDCCH repetition information includes the quantity of repeated transmission times of the PDCCH, the N PDCCH monitoring occasions are the first N PDCCH monitoring occasions configured in first search space;

in a case that the first information includes the second parameter and does not include the first parameter, the N PDCCH monitoring occasions are all PDCCH monitoring occasions configured in the first search space;

in a case that the first information includes the third parameter, the N PDCCH monitoring occasions include all PDCCH monitoring occasions configured in the P search spaces; and in a case that the first information includes the fourth parameter, the N PDCCH monitoring occasions include all PDCCH monitoring occasions configured in search space associated with the Q CORESET; where the first search space is search space associated with the PDCCH repetition.

In some embodiments, CORESETs associated with the P search spaces are the same, or CORESETs associated with the P search spaces are different.

In some embodiments, M search spaces in the P search spaces have the same time domain-related parameters.

The time-domain related parameters include at least one of the following: a monitoring periodicity, a monitoring offset, duration, or a monitoring symbol within slot, where M is an integer greater than 1.

In some embodiments, frequency domain resources of the Q CORESETs do not overlap.

In some embodiments, in a case that frequency domain resources of at least two CORESETs in the Q CORESETs overlap, the N PDCCH monitoring occasions include all PDCCH monitoring occasions configured in search space associated with a first CORESET; and the first CORESET is K CORESETs whose frequency domain resources do not overlap in the Q CORESETs, and K is an integer greater than 1 and less than or equal to Q.

In some embodiments, the radio frequency unit 1401 is further configured to:

report terminal capability information to a network side device, where the terminal capability information includes at least one of the following: a blind detection manner supported by the terminal, and a PDCCH repetition manner supported by the terminal.

In some embodiments, the blind detection manner includes at least one of the following: joint blind detection or independent blind detection.

The PDCCH repetition manner includes at least one of the following: segmented DCI transmission or integral DCI transmission.

In some embodiments, the radio frequency unit 1401 is further configured to:

receive configuration information sent by the network side device, where the configuration information is used to configure at least one of the following: a target blind detection manner, and a target PDCCH repetition manner; and monitor the PDCCH repetition based on the configuration information and the first information.

In some embodiments, in a case that a blind detection capability supported by the terminal does not include joint blind detection, the target PDCCH repetition manner is integral DCI transmission.

In some embodiments, in a case that the target blind detection manner is joint blind detection and the target PDCCH repetition manner is integral DCI transmission, DCI carried by the PDCCH repetition meets at least one of the following: a same DCI size, a same DCI format, or same DCI content.

In some embodiments, the first information is carried in at least one of a search space information element or a CORESET information element.

It should be noted that the terminal 1400 in this embodiment can implement each process in the method embodiment of FIG. 4 in the embodiments of the present disclosure, and achieve a same technical effect. To avoid repetition, details are not described herein again.

Figure 15:
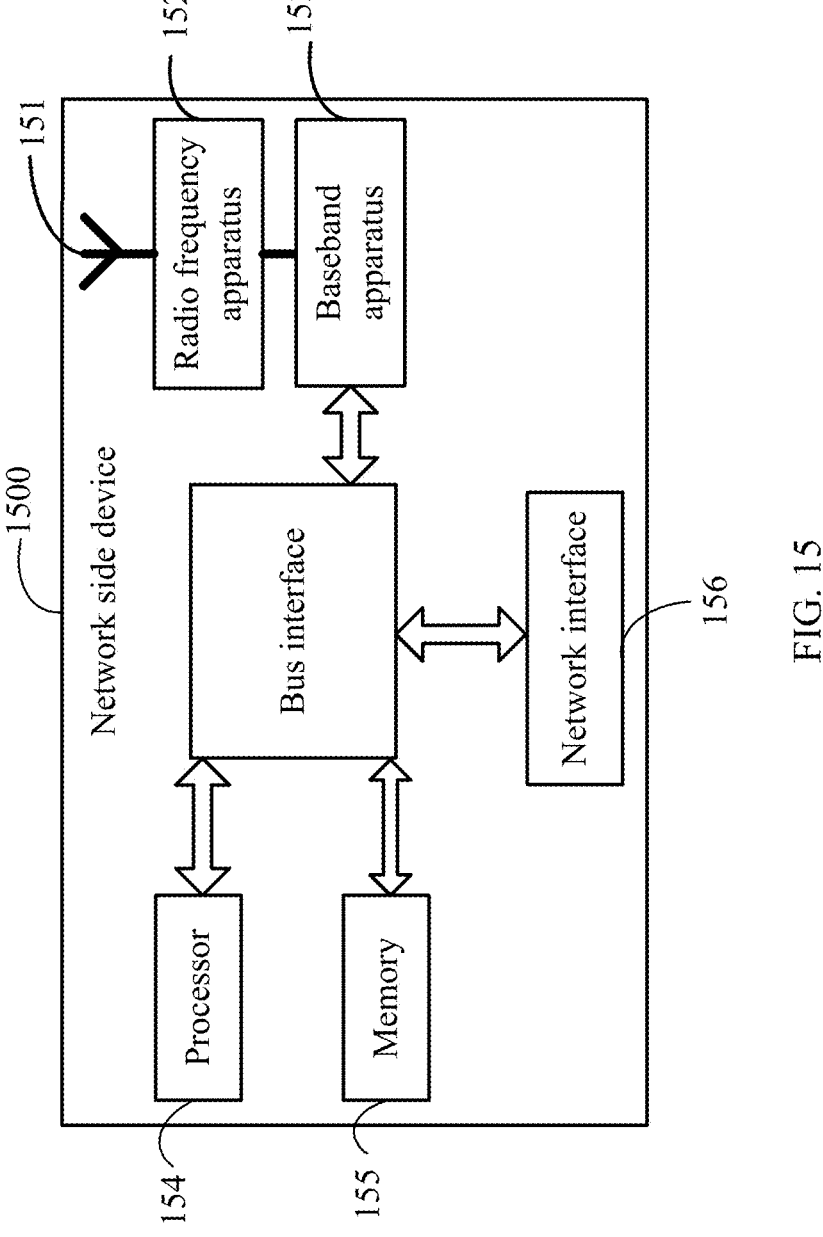
FIG. 15 is a structural diagram of a network side device according to an embodiment of this application.

For example, an embodiment of this application further provides a network side device. As shown in FIG. 15, the network device 1500 includes an antenna 151, a radio frequency apparatus 152, and a baseband apparatus 153. The antenna 151 is connected to the radio frequency apparatus 152. In an uplink direction, the radio frequency apparatus 152 receives information by using the antenna 151, and sends the received information to the baseband apparatus 153 for processing. In a downlink direction, the baseband apparatus 153 processes to-be-sent information, and sends the to-be-sent information to the radio frequency apparatus 152. After processing the received information, the radio frequency apparatus 152 sends the information by using antenna 151.

The foregoing band processing apparatus may be located in the baseband apparatus 153. In the foregoing embodiment, a method performed by the network side device may be implemented in the baseband apparatus 153. The baseband apparatus 153 includes a processor 154 and a memory 155.

For example, the baseband apparatus 153 may include at least one baseband board. Multiple chips are disposed on the baseband board. As shown in FIG. 15, one chip is, for example, the processor 154, and is connected to the memory 155, to invoke a program in the memory 155 to perform an operation of the network side device shown in the foregoing method embodiment.

The baseband apparatus 153 may further include a network interface 156, configured to exchange information with the radio frequency apparatus 152, where the interface is, for example, a Common Public Radio Interface (CPRI).

For example, the network side device in this embodiment of the present disclosure further includes an instruction or a program that is stored in the memory 155 and that can run on the processor 154. The processor 154 invokes the instruction or the program in the memory 155 to perform the processes in the method embodiment in FIG. 5, and a same technical effect is achieved. To avoid repetition, details are not described herein.

An embodiment of this application further provides a readable storage medium. A program or an instruction is stored in the readable storage medium. When the program or the instruction is executed by a processor, the processes of the method embodiment in FIG. 4 or FIG. 5 can be implemented, and a same technical effect can be achieved. To avoid repetition, details are not described herein.

The processor is a processor in the terminal in the foregoing embodiment. The readable storage medium includes a computer-readable storage medium such as an ROM, an RAM, a magnetic disk, an optical disc, or the like.

An embodiment of this application further provides a chip. The chip includes a processor and a communication interface, the communication interface is coupled to the processor, and the processor is configured to run a program or an instruction of a network side device to implement the processes of the method embodiment in FIG. 4 or FIG. 5, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the application and design constraints of the technical solution. A person skilled in the art may use different methods for each particular application to implement the described functions, but such implementation shall not be considered to be outside the scope of the present disclosure.

It may be clearly understood by a person skilled in the art that, for convenience and brevity of description, for a specific working process of the foregoing described system, apparatus, and unit, reference may be made to a corresponding process in the foregoing method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual coupling or direct coupling or communication connection may be through some interfaces, indirect coupling or communication connection of the apparatus or unit, and may be in an electrical, mechanical, or another form.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each unit may exist separately physically, or two or more units may be integrated into one unit.

According to the descriptions of the foregoing implementations, a person skilled in the art may clearly understand that the foregoing method embodiments may be implemented by using software and a required universal hardware platform, or may be implemented by using hardware. In some embodiments, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

It may be understood that the embodiments described in the embodiments of the present disclosure may be implemented by hardware, software, firmware, middleware, microcode, or a combination thereof. For hardware implementation, a module, a unit, a subunit, or the like may be implemented in one or more Application Specific Integrated Circuits (ASICs), a Digital Signal Processor (DSP), a DSP Device (DSPD), a Programmable Logic Device (PLD), a Field-Programmable Gate Array (FPGA), a general purpose processor, a controller, a microcontroller, a microprocessor, another electronic unit configured to perform the functions described in the present disclosure, or a combination thereof.

For software implementations, the techniques described in the embodiments of the present disclosure may be implemented by modules (for example, processes and functions) that perform the functions described in the embodiments of the present disclosure. The software code may be stored in a memory and executed by a processor. The memory may be implemented in or outside the processor.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. A Physical Downlink Control Channel (PDCCH) monitoring method, performed by a terminal, comprising:
   obtaining first information; and
   monitoring a PDCCH repetition based on the first information, wherein
   the first information comprises
   a third parameter, wherein the third parameter is used to indicate P linked search space sets for the PDCCH repetition, and P is a positive integer;
   wherein M search space sets in the P linked search space sets have the same time domain-related parameters; and
   the time domain-related parameters comprise at least one of the following: a monitoring periodicity, a monitoring offset, or duration, wherein M is an integer greater than 1.

2. The PDCCH monitoring method according to claim 1, wherein the PDCCH repetition is associated with a target object, and the target object comprises one of the following:
   search space set for the PDCCH repetition;
   a first type of search space set for the PDCCH repetition;
   a first Aggregation Level (AL) for the PDCCH repetition; or
   Downlink Control Information (DCI) with a first format for the PDCCH repetition.

3. The PDCCH monitoring method according to claim 2, wherein the target object is determined based on the first information; and
   the first information further comprises a fifth parameter used to indicate the target object, or
   the first information further comprises a second parameter used to indicate whether the target object performs the PDCCH repetition.

4. The PDCCH monitoring method according to claim 1, wherein
   the first information comprises at least one of the following:
   a first parameter, wherein the first parameter is used to indicate PDCCH repetition information, wherein the PDCCH repetition information comprises at least one of the following: times of the PDCCH repetition, a monitoring occasion of the PDCCH repetition, or duration of the PDCCH repetition;
   a second parameter, wherein the second parameter is used to indicate whether to perform the PDCCH repetition; or
   a fourth parameter, wherein the fourth parameter is used to indicate Q Control Resource Sets (CORESETs) for the PDCCH repetition, and Q is a positive integer,
   wherein the monitoring a PDCCH repetition based on the first information comprises:
   monitoring the PDCCH repetition on N PDCCH monitoring occasions, wherein the N PDCCH monitoring occasions are determined based on the first information, and N is a positive integer, wherein the N PDCCH monitoring occasions meet at least one of the following:
   in a case that the first information comprises the first parameter, and the PDCCH repetition information comprises the monitoring occasion of the PDCCH repetition, the N PDCCH monitoring occasions comprise a monitoring occasion that is of the PDCCH repetition and that is indicated by the PDCCH repetition information;
   in a case that the first information comprises the first parameter, and the PDCCH repetition information comprises a quantity of repeated transmission times of the PDCCH, the N PDCCH monitoring occasions are the first N PDCCH monitoring occasions configured in first search space set;
   in a case that the first information comprises the second parameter and does not comprise the first parameter, the N PDCCH monitoring occasions are all PDCCH monitoring occasions configured in the first search space set;
   in a case that the first information comprises the third parameter, the N PDCCH monitoring occasions comprise all PDCCH monitoring occasions configured in the P linked search space sets; or
   in a case that the first information comprises the fourth parameter, the N PDCCH monitoring occasions comprise all PDCCH monitoring occasions configured in search space set associated with the Q CORESETs, wherein
   the first search space set is search space set associated with the PDCCH repetition.

5. The PDCCH monitoring method according to claim 1, wherein
   the time domain-related parameters further comprise a monitoring symbol within slot.

6. The PDCCH monitoring method according to claim 4, wherein frequency domain resources of the Q CORESETs do not overlap;
   or,
   in a case that frequency domain resources of at least two CORESETs in the Q CORESETs overlap, the N PDCCH monitoring occasions comprise all PDCCH monitoring occasions configured in search space set associated with a first CORESET of the at least two CORESETs; and
   the first CORESET is K CORESETs whose frequency domain resources do not overlap in the Q CORESETs, and K is an integer greater than 1 and less than or equal to Q.

7. The PDCCH monitoring method according to claim 1, wherein before the monitoring a PDCCH repetition based on the first information, the method further comprises:
   reporting terminal capability information to a network side device, wherein the terminal capability information comprises at least one of the following: a blind detection manner supported by the terminal, or a PDCCH repetition manner supported by the terminal.

8. The PDCCH monitoring method according to claim 7, wherein before the reporting terminal capability information to a network side device and before the monitoring a PDCCH repetition based on the first information, the method further comprises:
   receiving configuration information sent by the network side device, wherein the configuration information is used to configure at least one of the following: a target blind detection manner, and a target PDCCH repetition manner; and the monitoring a PDCCH repetition based on the first information comprises:

monitoring the PDCCH repetition based on the configuration information and the first information.

9. A Physical Downlink Control Channel (PDCCH) sending method, performed by a network side device, comprising:

sending first information to a terminal; and sending a PDCCH repetition based on the first information; wherein the first information comprises a third parameter, wherein the third parameter is used to indicate P linked search space sets for the PDCCH repetition, and P is a positive integer;

wherein M search space sets in the P linked search space sets have the same time domain-related parameters; and the time domain-related parameters comprise at least one of the following: a monitoring periodicity a monitoring offset, or duration, wherein M is an integer greater than 1.

10. The PDCCH sending method according to claim 9, wherein the PDCCH repetition is a PDCCH associated with a target object, and the target object comprises one of the following:

search space set for the PDCCH repetition;

a first type of search space set for the PDCCH repetition;

a first Aggregation Level (AL) for the PDCCH repetition; or

Downlink Control Information (DCI) with a first format for the PDCCH repetition.

11. The PDCCH sending method according to claim 10, wherein the target object is determined based on the first information; and the first information further comprises a fifth parameter used to indicate the target object, or the first information further comprises a second parameter used to indicate whether the target object performs the PDCCH repetition.

12. The PDCCH sending method according to claim 9, wherein the first information comprises at least one of the following:

a first parameter, wherein the first parameter is used to indicate PDCCH repetition information, wherein the PDCCH repetition information comprises at least one of the following: times of the PDCCH repetition, a monitoring occasion of the PDCCH repetition, or duration of the PDCCH repetition;

a second parameter, wherein the second parameter is used to indicate whether to perform the PDCCH repetition; or a fourth parameter, wherein the fourth parameter is used to indicate Q Control Resource Sets (CORESETs) for the PDCCH repetition, and Q is a positive integer, wherein the sending a PDCCH repetition based on the first information comprises:

sending the PDCCH repetition on N PDCCH monitoring occasions, wherein the N PDCCH monitoring occasions are determined based on the first information, and N is a positive integer, wherein the N PDCCH monitoring occasions meet at least one of the following:

in a case that the first information comprises the first parameter, and the PDCCH repetition information comprises the monitoring occasion of the PDCCH repetition, the N PDCCH monitoring occasions comprise a monitoring occasion that is of the PDCCH repetition and that is indicated by the PDCCH repetition information;

in a case that the first information comprises the first parameter, and the PDCCH repetition information comprises a quantity of repeated transmission times of the PDCCH, the N PDCCH monitoring occasions are the first N PDCCH monitoring occasions configured in first search space set;

in a case that the first information comprises the second parameter and does not comprise the first parameter, the N PDCCH monitoring occasions are all PDCCH monitoring occasions configured in the first search space set;

in a case that the first information comprises the third parameter, the N PDCCH monitoring occasions comprise all PDCCH monitoring occasions configured in the P linked search space sets; or in a case that the first information comprises the fourth parameter, the N PDCCH monitoring occasions comprise all PDCCH monitoring occasions configured in the search space associated with the Q CORESETs; wherein the first search space set is search space set associated with the PDCCH repetition.

13. The PDCCH sending method according to claim 9, wherein the time-domain related parameters further comprise a monitoring symbol within slot.

14. The PDCCH sending method according to claim 9, wherein frequency domain resources of the Q CORESETs do not overlap;

or, in a case that frequency domain resources of at least two CORESETs in the Q CORESETs overlap, the N PDCCH monitoring occasions comprise all PDCCH monitoring occasions configured in search space set associated with a first CORESET of the at least two CORESETs; and the first CORESET is K CORESETs whose frequency domain resources do not overlap in the Q CORESETs, and K is an integer greater than 1 and less than or equal to Q.

15. The PDCCH sending method according to claim 9, wherein before the sending a PDCCH repetition based on the first information, the method further comprises:

receiving terminal capability information reported by the terminal, wherein the terminal capability information comprises at least one of the following: a blind detection manner supported by the terminal, and a PDCCH repetition manner supported by the terminal.

16. The PDCCH sending method according to claim 15, wherein before the receiving terminal capability information reported by the terminal and before the sending a PDCCH repetition based on the first information, the method further comprises:

sending configuration information to the terminal, wherein the configuration information is used to configure at least one of the following: a target blind detection manner, and a target PDCCH repetition manner; and the sending a PDCCH repetition based on the first information comprises:

sending the PDCCH repetition based on the configuration information and the first information.

17. A terminal, comprising: a memory having a computer program stored thereon; and a processor, wherein the computer program, when executed by the processor, causes the processor to perform a Physical Downlink Control Channel (PDCCH) monitoring method, comprising:

obtaining first information; and monitoring a PDCCH repetition based on the first information, wherein the first information comprises a third parameter, wherein the third parameter is used to indicate P linked search space sets for the PDCCH repetition, and P is a positive integer;

wherein M search space sets in the P linked search space sets have the same time domain-related parameters; and the time domain-related parameters comprise at least one of the following: a monitoring periodicity, a monitoring offset, or duration, wherein M is an integer greater than 1.

18. The terminal according to claim 17, wherein the PDCCH repetition is associated with a target object, and the target object comprises one of the following:

search space set for the PDCCH repetition;

a first type of search space set for the PDCCH repetition;

a first Aggregation Level (AL) for the PDCCH repetition; or

Downlink Control Information (DCI) with a first format for the PDCCH repetition.

19. The terminal according to claim 17, wherein the first information comprises at least one of the following:

a first parameter, wherein the first parameter is used to indicate PDCCH repetition information, wherein the PDCCH repetition information comprises at least one of the following: times of the PDCCH repetition, a monitoring occasion of the PDCCH repetition, or duration of the PDCCH repetition;

a second parameter, wherein the second parameter is used to indicate whether to perform the PDCCH repetition; or a fourth parameter, wherein the fourth parameter is used to indicate Q Control Resource Sets (Q CORESETs) for the PDCCH repetition, and Q is a positive integer, wherein the monitoring a PDCCH repetition based on the first information comprises:

monitoring the PDCCH repetition on N PDCCH monitoring occasions, wherein the N PDCCH monitoring occasions are determined based on the first information, and N is a positive integer, wherein the N PDCCH monitoring occasions meet at least one of the following:

in a case that the first information comprises the first parameter, and the PDCCH repetition information comprises the monitoring occasion of the PDCCH repetition, the N PDCCH monitoring occasions comprise a monitoring occasion that is of the PDCCH repetition and that is indicated by the PDCCH repetition information;

in a case that the first information comprises the first parameter, and the PDCCH repetition information comprises a quantity of repeated transmission times of the PDCCH, the N PDCCH monitoring occasions are the first N PDCCH monitoring occasions configured in first search space set;

in a case that the first information comprises the second parameter and does not comprise the first parameter, the N PDCCH monitoring occasions are all PDCCH monitoring occasions configured in the first search space set;

in a case that the first information comprises the third parameter, the N PDCCH monitoring occasions comprise all PDCCH monitoring occasions configured in the P linked search space sets; or in a case that the first information comprises the fourth parameter, the N PDCCH monitoring occasions comprise all PDCCH monitoring occasions configured in search space set associated with the Q CORESETs, wherein the first search space set is search space set associated with the PDCCH repetition.

20. A network side device, comprising: a memory having a computer program stored thereon; and a processor, wherein the computer program, when executed by the processor, causes the processor to perform the PDCCH sending method according to claim 9.

* * * * *